US012001196B2

(12) United States Patent
Mazur et al.

(10) Patent No.: US 12,001,196 B2
(45) Date of Patent: Jun. 4, 2024

(54) SYMBOLIC ACCESS OF INDUSTRIAL DEVICE SYSTEMS AND METHODS

(71) Applicant: Rockwell Automation Technologies, Inc., Mayfield Heights, OH (US)

(72) Inventors: David C. Mazur, Mequon, WI (US); Rob A. Entzminger, Shawnee, KS (US); Jonathan Alan Mills, Mayfield Heights, OH (US); Bruce T. McCleave, Jr., Mission Viejo, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/948,921

(22) Filed: Sep. 20, 2022

(65) Prior Publication Data

US 2024/0094713 A1 Mar. 21, 2024

(51) Int. Cl.
*G05B 19/41* (2006.01)
*G05B 19/418* (2006.01)

(52) U.S. Cl.
CPC ... *G05B 19/41845* (2013.01); *G05B 19/4186* (2013.01)

(58) Field of Classification Search
CPC ............. G05B 19/41845; G05B 19/4186
See application file for complete search history.

(56) References Cited

U.S. PATENT DOCUMENTS

| | | | |
|---|---|---|---|
| 2014/0100676 A1* | 4/2014 | Scott ................... | G06F 3/0484 700/83 |
| 2015/0193418 A1* | 7/2015 | Koska ................... | H04L 67/10 715/223 |
| 2015/0355611 A1* | 12/2015 | Laycock ............... | G06F 3/0481 700/83 |
| 2017/0285623 A1* | 10/2017 | Figoli .................. | G06F 13/4068 |
| 2017/0308360 A1 | 10/2017 | Kambach et al. | |
| 2020/0103843 A1* | 4/2020 | Stump .................. | G05B 19/052 |
| 2021/0003996 A1 | 1/2021 | Nagabhairava et al. | |
| 2022/0206470 A1* | 6/2022 | Wallace ............. | G05B 19/4185 |

OTHER PUBLICATIONS

Extended European Search Report for Application No. 23197950.1 mailed Feb. 8, 2024, 10 pages.

* cited by examiner

*Primary Examiner* — Christopher W Carter
(74) *Attorney, Agent, or Firm* — Fletcher Yoder, P.C.

(57) ABSTRACT

Embodiments of this present disclosure may include systems that perform operations including receiving a first symbol instance from an industrial automation device. The first template object instance may characterize a dataset accessible to the industrial automation device. Symbol object instances may inherit a categorization with respect to categories associated with the industrial automation device including an identity, a state, a runtime status, a maintenance status, sustainability information, or any combination thereof. The operations may include receiving a first input corresponding to the first symbol object instance. The first input may include an indication of a change to the original symbolic definition. The operations may include identifying a type of the industrial automation device based on the first symbol object instance and generating enhanced template data based on the type of the industrial automation device, the first input, and the first symbol object instance.

20 Claims, 8 Drawing Sheets

SYMBOLIC ACCESS OF INDUSTRIAL DEVICE SYSTEMS AND METHODS

BACKGROUND

This disclosure generally relates to industrial automation systems and, more particularly, to control systems and methods based on symbolic data access.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

Industrial automation systems may include automation control and monitoring systems. The automation control and monitoring systems may monitor and/or receive status information and/or sensing data from a wide range of devices, such as valves, electric motors, various types of sensors, other suitable monitoring devices, or the like. In addition, one or more components of the automation control and monitoring systems, such as programming terminals, automation controllers, input/output (IO) modules, communication networks, human-machine interface (HMI) terminals, and the like, may use the statuses and/or collected information to provide alerts to operators to change or adjust an operation of one or more components of the industrial automation system (e.g., such as adjusting operation of one or more actuators), to manage the industrial automation system, or the like.

Recent developments in industrial automation systems have increased complexity of industrial automation devices and interactions between the devices. New generations of industrial automation devices are expected to interface with, or control, legacy devices. Different brands, types, and generations of industrial automation devices may each generate different types of data for different purposes and with different measurement units. For example, voltages sensed for one motor drive might be in volts (V) but be sensed in kilovolts (kV) from another motor drive. Thus, industrial automation systems and methods that promote coordination between many different types of legacy industrial automation devices may be desired.

SUMMARY

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In one embodiment, a method may include receiving, via a processor, a first symbol object instance of a multiple symbol object instances from an industrial automation device. The first symbol object instance may characterize a dataset stored in a memory component accessible to the industrial automation device. Each of the symbol object instances may be categorized with respect to one or more categories including an identity of the industrial automation device, a state of the industrial automation device, a runtime status of the industrial automation device, maintenance status associated with the industrial automation device, sustainability information of the industrial automation device, or any combination thereof. Each of the symbol object instances may correspond to an original symbolic definition associated with the industrial automation device. The method may include receiving, via the processor, a first input corresponding to the first symbol object instance, where the first input may include an indication of a change to the original symbolic definition. The method may include identifying a type of the industrial automation device based on the first symbol object instance. The method may include generating, via the processor, enhanced template data based on the type of the industrial automation device, the first input, and the first symbol object instance. The enhanced template data may include one or more instantaneous values associated with the dataset and one or more categories associated with the first symbol object instance. The method may include sending, via the processor, the enhanced template data to one or more devices that associate the dataset with the enhanced template data.

In another embodiment, a tangible, non-transitory, computer-readable medium may include instructions that, when executed by a processor, causes a control system to perform operations. The operations may include receiving a first symbol object instance of multiple symbol object instances from an industrial automation device, where the first symbol object instance may characterize a dataset stored in a memory component accessible to the industrial automation device. Each of the symbol object instances may be categorized with respect to one or more categories including an identity of the industrial automation device, a state of the industrial automation device, a runtime status of the industrial automation device, maintenance status associated with the industrial automation device, sustainability information of the industrial automation device, or any combination thereof. Each of the symbol object instances may correspond to an original symbolic definition associated with the industrial automation device. The operations may include receiving a first input corresponding to the first symbol object instance, where the first input may include an indication of a change to the original symbolic definition. The operations may include identifying a type of the industrial automation device based on the first symbol object instance. The operations may include generating enhanced template data based on the type of the industrial automation device, the first input, and the first symbol object instance, where the enhanced template data includes one or more instantaneous values associated with the dataset and one or more categories associated with the first symbol object instance. The operations may include sending the enhanced template data to one or more devices that associate the dataset with the enhanced template data.

In yet another embodiment a tangible, non-transitory, computer-readable medium may include instructions that, when executed by a processor, cause a control system to perform operations including receiving a first symbol object instance of multiple symbol object instances from an industrial automation device. The first symbol object instance may characterize a dataset stored in a memory component accessible to the industrial automation device. Each of the symbol object instances may be categorized with respect to one or more categories including an identity of the industrial automation device, a state of the industrial automation device, a runtime status of the industrial automation device, maintenance status associated with the industrial automation device, sustainability information of the industrial automation device, or any combination thereof. Each of the symbol object instances may correspond to an original symbolic definition associated with the industrial automation device. The operations may include receiving a first input corresponding to the first symbol object instance, where the first input may include an indication of a change to the original symbolic definition. The operations may include identifying a type of the industrial automation device and respective types of one or more child devices associated with the industrial automation device based on the first symbol object instance. The operations may include generating enhanced template data based on the type of the industrial automation device, the first input, the first symbol object instance, and respective types of the one or more child devices. The enhanced template data may include one or more instantaneous values associated with the dataset, one or more of the categories associated with the first symbol object instance, and one or more datasets associated with the one or more child devices. The operations may include sending the enhanced template data to one or more devices that associate the dataset with the enhanced template data.

BRIEF DESCRIPTION OF THE DRAWINGS

These and other features, aspects, and advantages of the present disclosure may become better understood when the following detailed description is read with reference to the accompanying drawings in which like characters represent like parts throughout the drawings, wherein.

DETAILED DESCRIPTION

Figure 1:
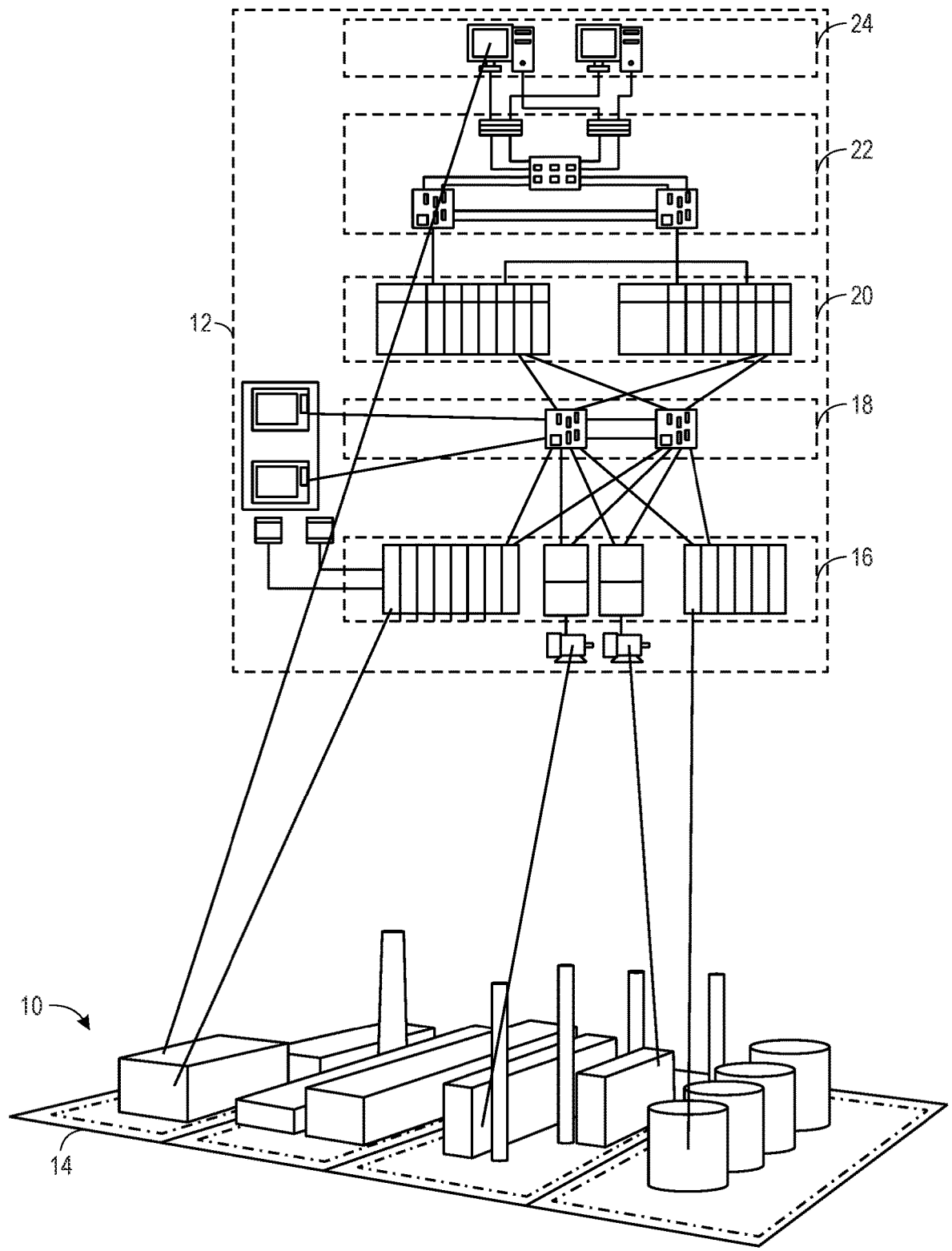
FIG. 1 is a diagrammatic representation of an example industrial automation system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Connecting intelligent devices to the connected enterprise has been a time consuming and complex process for customers integrating new devices into existing systems. A universal and easily connected interface for obtaining data from various types of devices operating using different communication protocols, different information model formats, manufactured by different entities, and the like, continues to be a challenge. Instead, customers are asked to connect and model the acquired data within a local controller or create product specific profiles that may characterize the data collected from other devices in a manner that is useful to the local controller. Furthermore, developments in industrial systems have resulted in increased complexity of interactions between the currently installed devices and newer generations of industrial automation devices. With this in mind, the present disclosure is generally directed towards using symbolic data operations to communicate between devices in an industrial automation system, thereby enabling industrial automation devices that use different information model formats to have consistent reporting and control operations and functions. Included in symbolic data operations may be the ability to encode an addressing path (e.g., internal object identifier GOD path to an object) which identifies through a logical operation the data table represented by a symbol object instance with a more efficient access operation. The addressing path and the symbol object instance represent the same data but allow access in different ways to assist with better performance needs. By using systems and methods to reference operational data in a manner using labels understandable to both machine and software, fewer look-up operations may be used to route data from a data source to a data consuming device, and thus fewer computing operations may be used to implement control and processing operations relative to other systems not using symbolic data operations.

As used herein, a symbol (e.g., symbol object instance) may be considered a textual name used to represent a specific related instance of data or value, within a data storage entity. For example, a symbol object instance named "Heatsink Temperature of Control Board" represents a sampled temperature value of a temperature sensor that is stored in a computing resource collecting the sampled temperature value from the heatsink temperature probe. The symbol object instance may be referenced along with the template to access the sampled temperature value. For example, a control system using that sampled temperature value would reference DataStructure.HeatsinkTemperatureOfControlBoard when accessing the sampled temperature value as opposed to an alternative address path notion. In some cases, a symbol object instance may help decode a specific data portion from a larger set of data and the specific data portion may be associated to a data type definition from a corresponding defined template object instance. The template object instance defines data types and formatting of the data portions of the larger set of data that is used when decoding the data portion from the larger set of data based on the symbol object instance.

As used herein, a template may be considered a format of the data (or value) that identifies how to interpret (or how to use) the specific related instance of data or value stored within a data storage entity. The template may be a globally set definition, and a specific instance or use of the template for a specific device and corresponding data set may be referred to as a template object instance. For example, a template for a temperature value may indicate that there are four bytes of memory that should be read from the storage entity, and that the value may have both positive and negative values represented in the range of temperatures that can be expressed. A template object instance corresponding to the template for the template value may indicate that, for a specific device, temperature values of a dataset stored in association with that device have four bytes and may have a positive or a negative value. A template may define a format of another template, such as when a first template references multiple nested templates. The format used to interpret each of the multiple nested templates is defined by the first template.

The implementation of symbolic data operations using systems and methods detailed below allows certain systems to interact with disparate systems (e.g., different information model formats) using a standardized, flexible, and extendable interface that can be used to expose a broad range of data models provided from other devices. The symbolic data operations may be based on at least two underlying data objects—a symbol object instance and a template object. An industrial automation device may use symbolic data operations, as opposed to traditional class, instance, and attribute (CIA) lookup operations when communicating with other devices. The symbolic data operations may involve control systems of the industrial automation system accessing data associated with an industrial automation device through symbolic and template object instances of the information model formats. Furthermore, the symbolic data operations may improve operation of the industrial automation system by reducing an amount of computing resources used to access and identify data associated with the industrial automation device.

By using these described systems and methods, the industrial automation system may exchange data using symbol/template data access techniques (e.g., symbolic data operations) that may be enabled via symbol object instances and template object instances. As a result, one or more intermediary control systems may be incorporated into the industrial automation system to aggregate or process data generated by industrial automation devices. Indeed, an industrial automation system using symbolic data operations may bypass certain operations.

To elaborate, a symbol object instance may be defined by a corresponding template object instance which defines the structure, format, features, and/or properties of a portion of data that has a logical association with the symbol object instance, where the features or properties may be representative of status, identity, analytic capabilities of operating devices, or the like. The symbol object instance may be used to provide symbolic access to global and local data within a product. Template object instances describe the data type of the data referenced by the symbol object instance. The symbol may help expose data of the device in a common and consistent manner, providing relatively less complex consumption of the data as an example benefit of these systems and methods.

A template object instance may be a data object that is referenced by a symbol object instance. The template (e.g., template object instance) may reference a set of data types aggregated together by a common data structure, which may include any associated nested template object instances (e.g., sub-members) and data types associated with the nested template object instances.

Keeping the foregoing in mind, it may be useful to adjust symbol and template definitions such as, a respective symbol object instance and/or a respective template object instance over time. By doing so, an industrial automation system and/or an associated cloud computing system may update respective datasets to gain a more complete understanding of the devices in an industrial automation system and operations performed by the devices in the industrial automation system, which may be flexibly adjusted over time to account for system or process changes. For example, a computing device may ship with one set of symbolic definitions and later be adjusted to add additional symbolic definitions in response to a user input, based on automated processes, or the like. As such, the embodiments described below may enable a system to add to or change existing symbolic definitions, which may enable the industrial automation system and/or the cloud computing system to better control, manage, or optimize the industrial automation system and its components. Indeed, systems and methods to modify existing symbolic definitions may improve industrial automation system operations by better representing a present capability or state of respective industrial automation components within or associated with the industrial automation system. Having updated capabilities accessible via symbolic data operations may improve usability of the updated capabilities and may enable discoverable of the updated capabilities, as well as data associated with the updated capabilities, system-wide to internal and external devices in communication with the industrial automation system, leading to a flexible and desirable automation and control solution.

Moreover, by making adjustments to an existing symbolic definition, more context-rich data may be shared between industrial automation systems and cloud computing systems as the symbolic definitions are dynamically updated. For instance, as edge devices receive data (e.g., from automation devices), the edge devices may add metadata to the data via an additional symbolic definition to provide context for the data to enable the cloud computing system to have a better understanding of the data and any device(s) associated with the data. In this way, data may be tagged to indicate a process associated with the data, which device or devices are associated with the data, units for the data, or any other context for the data. A data historian could also be utilized in conjunction with the pipeline to add more context, for example, by adorning objects, as more and more data is generated by a process or processes in an industrial automation system. Additional details with regard to adjusting symbol and template definitions in accordance with embodiments described herein will be detailed below with reference to FIGS. 1-8.

By way of introduction, FIG. 1 is a diagrammatic representation of an example industrial automation system 10 that includes a distributed control system 12 (e.g., a "DCS"). The industrial automation system 10 may include any number of industrial components.

Industrial components may include a user interface, the distributed control system 12, a motor drive, a motor, a conveyor, specialized original equipment manufacturer machines, fire suppressant system, and any other device that may enable production or manufacture products or process certain materials. In addition to the aforementioned types of industrial components, the industrial components may also include controllers, input/output (IO) modules, motor control centers, motors, human-machine interfaces (HMIs), user interfaces, contactors, starters, sensors, drives, relays, protection devices, switchgear, compressors, network switches (e.g., Ethernet switches, modular-managed, fixed-managed, service-router, industrial, unmanaged), and the like. The industrial components may also be related to various industrial equipment such as mixers, machine conveyors, tanks, skids, specialized original equipment manufacturer machines, and the like. The industrial components may also be associated with devices used in conjunction with the equipment such as scanners, flow meters, relays, gauges, valves, and the like. In one embodiment, every aspect of the industrial component may be controlled or operated by a single controller (e.g., control system), which may itself be considered an industrial component. In another embodiment, the control and operation of each aspect of the industrial components may be distributed via multiple controllers (e.g., control system).

The industrial automation system 10 may divide logically and physically into different units 14 corresponding to cells, areas, factories, subsystems, or the like of the industrial automation system 10. The industrial components (e.g., load components, processing components) may be used within a unit 14 to perform various operations for the unit 14. The industrial components may be logically and/or physically divided into the units 14 as well to control performance of the various operations for the unit 14.

The distributed control system 12 may include computing devices with communication abilities, processing abilities, controlling abilities, and the like. For example, the distributed control system 12 may include IO modules, relays, sensors, protection devices, switchgear, network switches, processing modules, a control system, a programmable logic controller (PLC), a programmable automation controller (PAC), or any other controller that may monitor, control, and operate an industrial automation device or component. In this way, a motor drive may be considered a device associated with the distributed control system 12 and an industrial component and a motor controlled by the drive may be considered an industrial component.

The distributed control system 12 may be wholly or partially incorporated into one or more physical devices (e.g., the industrial components), wholly or partially implemented as a stand-alone computing device (e.g., general purpose computer), such as a desktop computer, a laptop computer, a tablet computer, a mobile device computing device, or the like. For example, the distributed control system 12 may include many processing devices logically arranged in a hierarchy to implement control operations by disseminating control signals, monitoring operations of the industrial automation system 10, logging data as part of historical tracking operations, and so on. Devices of the distributed control system 12 may convert logical operations or computer commands into mechanical changes implemented via one or more industrial components.

In an example distributed control system 12, different hierarchical levels of devices may correspond to different operations. A first level 16 may include input/output communication modules (TO modules) to interface with industrial components in the unit 14. A second level 18 may include control systems that control components of the first level and/or enable intercommunication between components of the first level 16, even if not communicatively coupled in the first level 16. A third level 20 may include network components, such as network switches, that support availability of a mode of electronic communication between industrial components. A fourth level 22 may include server components, such as application servers, data servers, human-machine interface servers, or the like. The server components may store data as part of these servers that enable industrial automation operations to be monitored and adjusted over time. A fifth level 24 may include computing devices, such as virtual computing devices operated from a server to enable human-machine interaction via an HMI presented via a computing device. It should be understood that levels of the hierarchy are not exhaustive and nonexclusive, and thus devices described in any of the levels may be included in any of the other levels. For example, any of the levels may include some variation of an HMI.

One or more of the levels or components of the distributed control system 12 may use and/or include one or more processing components, including microprocessors (e.g., field programmable gate arrays, digital signal processors, application specific instruction set processors, programmable logic devices, programmable logic controllers), tangible, non-transitory, machine-readable media (e.g., memory such as non-volatile memory, random access memory (RAM), read-only memory (ROM), and so forth. The machine-readable media may collectively store one or more sets of instructions (e.g., algorithms) in computer-readable code form, and may be grouped into applications depending on the type of control performed by the distributed control system 12. In this way, the distributed control system 12 may be application-specific, or general purpose.

Furthermore, portions of the distributed control system 12 may be a or a part of a closed loop control system (e.g., does use feedback for control), an open loop control system (e.g., does not use feedback for control), or may include a combination of both open and closed system components and/or algorithms. Further, in some embodiments, the distributed control system 12 may utilize feed forward inputs. For example, the distributed control system 12 may control flow of a feedstock into a reactor depending on information relating to the feedstock.

As noted above, industrial components may include an HMI. Indeed, the distributed control system 12 may include or couple to one or more HMIs. The distributed control system 12 may represent components of the industrial automation system 10 through visualizations of the components on the display/operator interface. The distributed control system 12 may use data generated by sensors to update visualizations of the components via changing one or more indications of current operations of the components. These sensors may be any device adapted to provide information regarding process conditions. An operator monitoring the industrial automation system 10 may reference the display/operator interface to determine various statuses, states, and/or current operations, such as when adjusting operations of the industrial automation system 10 and/or for a particular component.

Data associated with the industrial automation device, such as data generated by the sensors described above, may be accessed by the distributed control system 12 using symbolic data operations. To improve industrial device operation and to make commissioning and maintenance less complex, it may be desired to enable industrial automation devices to report generated data as symbol and template object instances having common formatting among devices in an industrial automation system 10 and to enable control systems to adjust operations of the industrial automation system 10 based on the data accessed as the symbol and template objects. The symbol/template data access systems and methods described herein may improve industrial automation system 10 operation by reducing an amount of computing resources used to access and identify data associated with the industrial automation device, as well as enable a newly installed industrial automation device to program itself autonomously when communicatively coupled to a control system.

Figure 2:
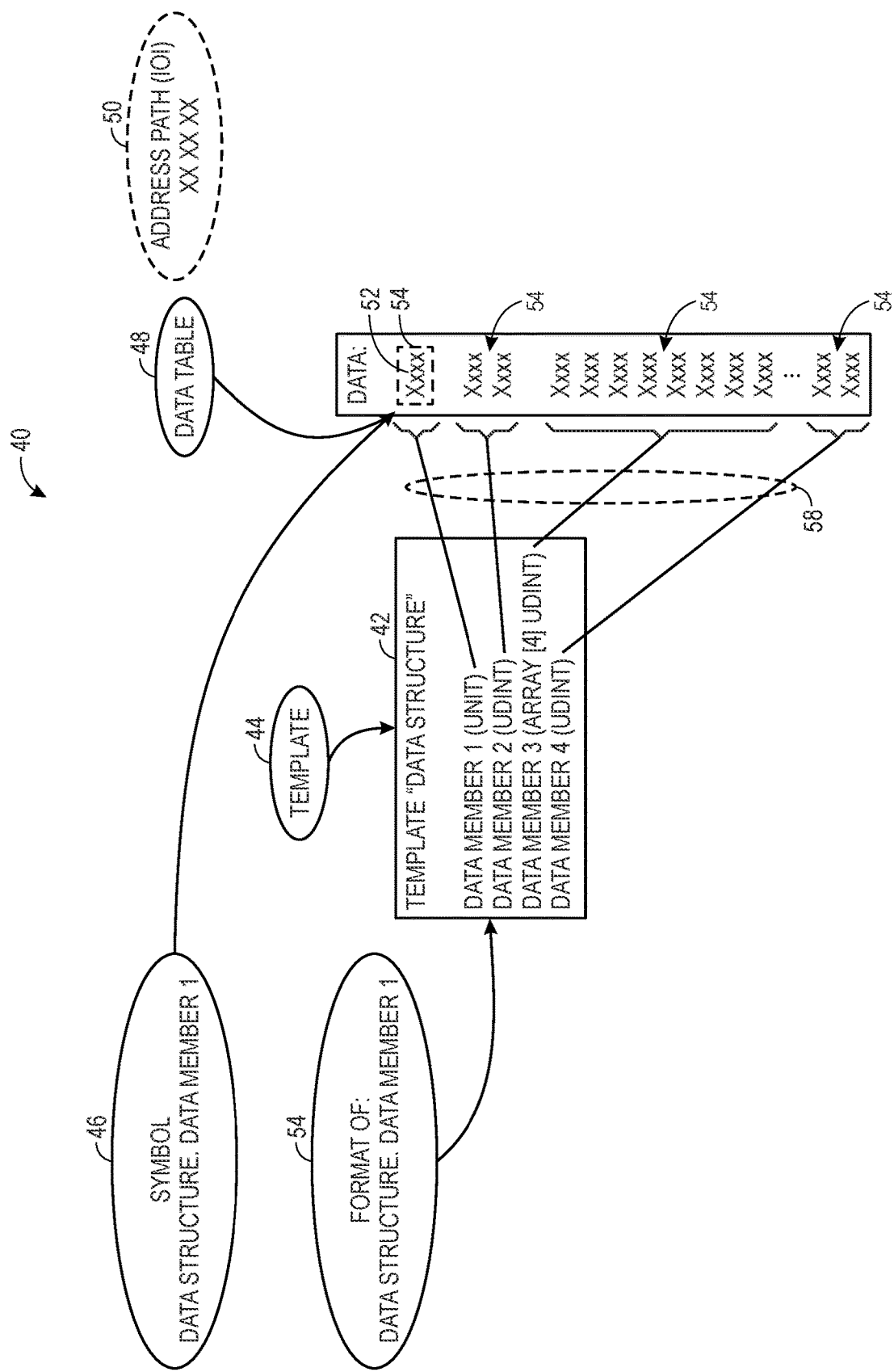
FIG. 2 is a diagrammatic representation of an example symbolic data structures associated with the industrial automation system of FIG. 1, in accordance with an embodiment.

To elaborate, FIG. 2 is a diagrammatic representation of an example symbolic data structures 40, such as an example template object instance 42 corresponding to a template 44, an example symbol object instance 54, an example template data 48 (e.g., example template dataset), and an example address path 50 (101). It is noted that IOI may be used for performance reasons (e.g., accessing stored data via IOI may sometimes consume fewer resources or power in processing the request).

A template 44 may provide the description of an individual data model, including all members and their data types (and templates can contain other template object instances 42) for that respective industrial automation device 86. A symbol 46 may be a data object defined by a corresponding template object that includes other features or properties related to the data object that represent status, identity, and/or analytic capabilities of one or more related operating devices. A symbol 46 may be implemented in a specific device as a symbol object instance 54 associated with a data value 52. The reference numbers are used herein to refer generally to templates and symbols and not necessarily to the exact template and symbol in the figures. In other words, the template 44 and symbol 46 of FIG. 2 may be for a specific motor drive application and the same template 44 and symbol 46 may be used in different applications, as well as for different nested devices.

The templates 44 may describe the data type of the data being referenced via the symbol 46 and may reference template object instances 42 as their described data type. Indeed, one or more of the symbols 46 may include additional references to additional nested sub-categories, which may be grouped as part of a nested template to enable a common reference to the group of sub-category symbols.

Reference arrow 58 graphically indicates within the template object instance 42 how the template object instance 42 may define a formatting of a symbolic data reference to a particular value of the example template data 48. The template object instance 42 may mirror the structure of the template 44. For example, when a device references the symbol object instance 54, "DataMember1," and the template object instance 42, "DataStructure," (e.g., via "DataStructure.DataMember1"), the device may access a data value 52 (e.g., to read, to write over) and determine a format of the data value 52 as UINT, as well as a relative position within the template data 48 of the data value 52, from the template object instance 42, which may be stored in memory accessible to the device, as described above.

Included in symbolic data operations may be the ability to encode one or more addressing paths, which may each be an internal object identifier (IOI) path to a respective object. For example, the address path 50 may be encoded and be an IOI path to the symbol object instance 54. Addressing paths may identify, through a logical operation, data tables represented by a symbol object instance 54 to provide a more efficient access operation. A respective addressing path and a corresponding symbol object instance 54 may represent the same data while permitting access in different ways to assist with better performance needs. For example, the address path 50 and the symbol object instance 54 both reference to data value 52.

Keeping the foregoing in mind, one example implementation includes a motor drive, which may be a relatively small device (e.g., relatively low horsepower) or a very large device (e.g., relatively high horsepower) with many different components internal to the motor drive. A motor drive may include certain components, like capacitors and fans. These components may individually require maintenance overtime and thus may be advantageously monitored individually via the symbol/template data access techniques. The symbol/template data access techniques may be used to make a template 44 for each identifiable component within the product. Thus, in a particular product, different symbol object instances 54 may correspond to the motor drive, a motor-side power output, a line-side power input, one or more of the capacitors, one or more of the fans, and any additional plugin options of the motor drive. The different symbol object instances 54 for the different inputs, outputs, and components of the motor drive, as well as the motor drive overall, may permit individual component electronic identification and monitoring. The industrial automation control system 78 individually identifying and monitoring the motor drive, its related inputs and outputs, and its internal or associated components may provide individualized maintenance alerts, individual performance alerts, individual control commands, or the like based on the symbol object instances 54 to more particularly tailor recommendations, alerts, or performed actions to the various components at the different levels. This may improve industrial automation system 10 operation by at least reducing total downtime with maintenance operations due to the tailored recommendations.

Figure 3:
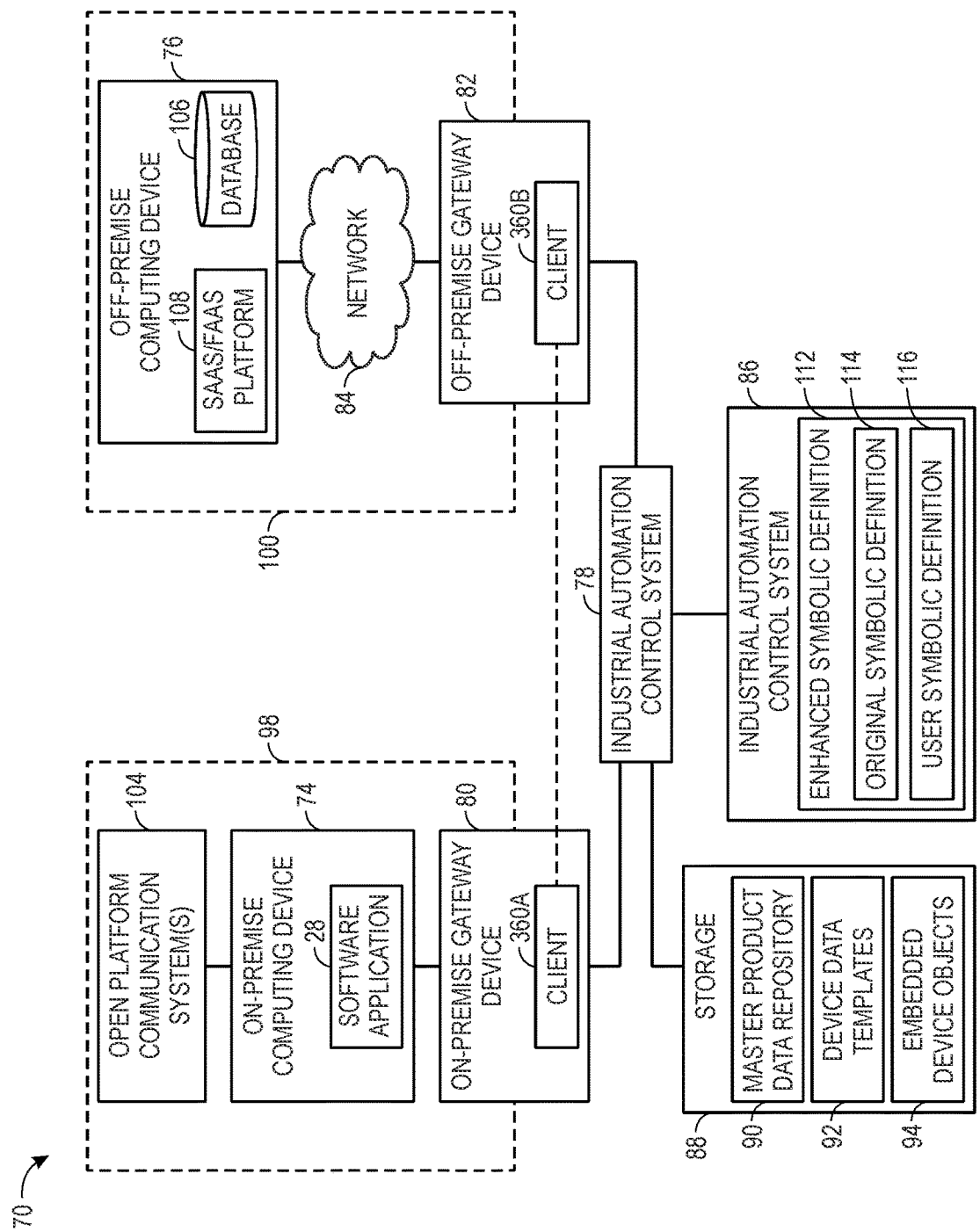
FIG. 3 is a system that includes the industrial automation system of FIG. 1 having edge computing and/or cloud computing devices able to perform symbolic data operations, in accordance with an embodiment.

As described above, the on-premise gateway device 80 may access template data 48 stored in the industrial automation system 10 on behalf of one or more on-premise computing devices, like the on-premise computing device 74. To elaborate, FIG. 3 illustrates an example system 70 that includes on-premise computing devices 74, off-premise computing devices 76 and an industrial automation control system 78. The distributed control system 12 described above may include the on-premise computing devices 74, an on-premise gateway device 80, the industrial automation control system 78, and the off-premise edge gateway device 82, where the off-premise edge gateway device 82 may communicate with off-premise computing devices 76 via a network 84. The distributed control system 12 may include industrial automation devices 86 that couple to and/or control connected industrial components to perform operations, such as making products, moving products, turning on, turning off, rotating, or the like. For example, the industrial automation devices 86 may include motor control drives within a motor control center that are coupled to and control operations of one or more motors, one or more fans, or the like. In some embodiments, the on-premise gateway device 80 and the off-premise gateway device 82 may directly communicatively couple to each other. The on-premise gateway device 80 may also communicate on networks internal to the industrial automation system 10 with devices within the industrial automation system 10. The networks internal to the industrial automation system 10 may be included in the on-premise computing domain 98 and may be external to the off-premise computing domain 100.

The industrial automation devices 86 may use symbol-template information models to enable symbol/template data access to the industrial automation control system 78. For example, the industrial automation device 86 may receive data associated with its own operation, classify the received data into a category of symbols 46, and store the data based on the classified category into a symbol object instance 54 associated with a template object instance 42 stored in a respective memory component. After the symbol object instance 54 is generated with stored data or stored references to additional data, firmware may store the symbol object instance 54 in the memory component, in the industrial automation control system 78, or the like, such that it can be accessed later by the industrial automation device 86, another industrial automation device 86, or other devices (e.g., on-premise gateway device 80, off-premise edge gateway device 82).

The on-premise gateway device 80 and the off-premise edge gateway device 82 may be communicatively coupled to each other and to the industrial automation control system 78. Industrial automation devices 86 may generate and report data as symbol object instances 54 and template object instances 42 having common formatting across devices within the system 72 to facilitate processing of the data, storing and handling of the data, and the like. That is, each device in the system 72, such as the on-premise gateway device 80 and/or the off-premise edge gateway device 82, may use symbolic data operations to perform certain tasks. Symbolic data operations may interface with industrial automation control system 78 and/or the industrial automation devices 86 to expose data to other devices, such as the on-premise gateway device 80 and the off-premise edge gateway device 82. The symbolic data operations may be based on representing device data through symbol object instances 54 and template object instances 42, both of which may be flexible and allow for a device to define its own data model and provide the definition of those models to other (e.g., different) devices. Moreover, inputs to the industrial automation system 10, such as inputs to the on-premise gateway device 80, the on-premise computing device 74, the off-premise gateway device 82, the off-premise computing device 76, the industrial automation control system 78, or the like, may cause a change in what categories or information are stored in those models, enabling further application flexibility.

By way of example, the industrial automation control system 78 may access data from one or more of the industrial automation devices 86 using symbolic data operations enabled by distributed IO products and other connected industrial automation devices. The distributed IO products may include some of the circuitry described with reference to the industrial automation control system 78. Firmware of the industrial automation device 86 may query a data source or receive data from a data source based on the symbol and store the retrieved datasets as instances of symbols with data type and formatting derived from template object instances 42 that correspond to the symbol represented in an industrial automation device 86. The data source may be a storage component that the industrial automation device 86 is communicatively coupled to, such as a data repository that receives sensed data from one or more sensors. The industrial automation device 86 may directly receive sensed data from one or more sensors. This data received from the storage component or from the sensor may be stored in, or otherwise associated with, a symbol instance dataset to enable symbolic access of the data.

Industrial automation devices 86 able to store associated data into a template dataset associated with a template accessed via symbolic data methods may enhance overall industrial automation system 10 operation. Symbols may integrate at least some of data generated via standard devices and connected devices (e.g., legacy devices without symbolic data compatibility) and data generated via intelligent devices (e.g., devices with symbolic data compatibility) into a consistent format that may be accessed via an information model format that corresponds to the industrial automation system 10. Storage 88 may include a master product data repository 90, device data templates 92, and embedded device objects 94. The storage 88 may be any suitable type of data storage device, such as a database, memory, or the like.

The master product data repository 90 may include product capability profiles, computer-aided design (CAD) models and attributes, digital twin models, augmented reality and/or virtual reality libraries, digital presence content management, persistence models, reporting, graphics, application enablement templates, or the like. The libraries, profiles, models, and so on included in the master product data repository 90 may each reference or operate based on the symbolic data between the master product data repository 90, the industrial automation devices 86, on-premise gateway device 80, off-premise edge gateway device 82, and/or any suitable on- and/or off-premise control and processing systems.

The device data templates 92 may include templates as device data models that may include one or more symbols and/or one or more templates. The device data templates 92 may be considered a template data definition and may indicate how to process and/or characteristics of template data relative to one or more templates and/or one or more symbols. Multiple template object instances 42 may be associated together in one template instance when, for example, a parent device includes multiple nested devices. The device data templates 92 may harmonize and standardize different data models (e.g., different vendor data models) with awareness of context data for higher level consumption. Examples of context data include a label describing a sensor that generated data that the context data describes, a timestamp associated with each of one or more instantaneous values of the generated data, a relative location of each of the one or more instantaneous values within the template data 48, or any combination thereof. Thus, the device data templates 92 may store or associate template object instances 42, data, and/or context data to each other, which may indicate a nested or parent-child relationship between symbolic definitions and thus corresponding devices.

The embedded device objects 94 may correspond to a data structure that associates collections of symbols to a device type. A template 44 may define data types and formatting of data included in the data structure, and the template 44 may be used to decode a set of data associated with the data structure. The embedded device objects 94 may include data structures for logical uses, physical uses, and application uses. For example, data structures of the embedded device objects 94 corresponding to logical uses include flying start templates, motor control templates, variable boost templates, sleep/wake templates, and the like. Expected states that may be included in a template as contextual data for a motor drive include "Running," "Ready," "At Speed," "Active," "At Zero Speed," "Enable On," "Alarmed," "Connected," "Faulted," or the like, as elaborated further on in at least FIG. 5 in association with product independent contextual data of a graphical display region. The embedded device objects 94 may correspond to power structure templates, motor data templates, predictive maintenance templates, encoder feedback templates, fan and/or pump templates, conveyor templates, hoist and/or lift/templates, and the like. These templates 44 may be referenced when processing generated data. A template 44 may indicate what data to expect in association with a motor, what data to expect in association with switchgear or power distribution equipment, and the like. In some cases, the embedded device objects 94 may correspond to a unit 14 specific templates 44.

The industrial automation control system 78 may access information of the embedded device objects 94 when registering an industrial automation device 86 to the industrial automation system 10, for example to access a data structure of the embedded device objects 94 corresponding to a type of the industrial automation device 86. The industrial automation control system 78 may use the corresponding data structure of the embedded device objects 94 to generate a template object instance 42 for the industrial automation device 86 in which future data generated and future contexts received may be populated into by the industrial automation control system 78 and/or by the industrial automation device 86. By using the embedded device object 94 that corresponds to the type of the industrial automation device 86, the industrial automation control system 78 may generate a template object instance 42 consistent in structure with other template object instances 42 generated previously for the same type of industrial automation devices 86. The data structures stored in the embedded device objects 94 may correspond to original symbolic definitions 114.

Data associated with the various device-level systems may be accessed by other components of the industrial automation system 10 via the on-premise gateway device 80. The on-premise gateway device 80 may communicate on networks internal to the industrial automation system 10 with devices within the industrial automation system 10. The on-premise gateway device 80 may be locally connected to one or more industrial automation devices 86, the industrial automation control system 78, or both, and may communicate with the various devices using messages and/or control signals that employ some operational technology (OT) communication schemes, such as the common industrial protocol (CIP). The on-premise gateway device 80 may access symbols 46 stored in the industrial automation devices 86 to process read requests as opposed to waiting to receive identifying information about each device and mapping the identifying information to the requested data for each device to read the requested data. The software application 96 may receive the symbols 46 from the on-premise gateway device 80 and analyze data of the symbols 46 to perform analysis, reporting, historical trending, or the like. The on-premise gateway device 80 may implement control loops based on the symbols 46 and/or may analyze data received via the symbols 46 in real time.

The on-premise gateway device 80 may operate on a logical boundary between the industrial automation control system 78 and an on-premise computing domain 98. The off-premise edge gateway device 82 may operate on a logical boundary between the industrial automation system 10 and an off-premise computing domain 100.

A communicative coupling 102 between the on-premise gateway device 80 and the off-premise edge gateway device 82 may be used to transmit data between the on-premise gateway device 80 and the off-premise edge gateway device 82. The communicative coupling 102 may be disposed within or outside the distributed control system 12. The on-premise gateway device 80 may communicate with one or more on-premise computing devices 74 to receive data from or transmit data to the software applications 96 executed by the on-premise computing device 74 and/or platform 104 provided via the on-premise computing device 74. Communications routed via the communicative coupling 102 may be afforded relatively lower transmission delays, different authentication operations, quicker processing, and thus lower consumption of computing resources, than communications between the on-premise gateway device 80 and the off-premise edge gateway device 82 routed through the industrial automation control system 78. Similarly, communications routed from the off-premise edge gateway device 82 to the industrial automation control system 78 may have different authentication operations than authentication operations used for communications routed from the on-premise gateway device 80 to the industrial automation control system 78. Furthermore, separating devices into different levels, as visualized in FIG. 1 but also as suggested in FIG. 2 with the differences between a domain including the industrial automation control system 78 and the on-premise computing domain 98, may have the additional improvement of selective deployment of authentication operations and security provisions.

The off-premise edge gateway device 82 may access data of the industrial automation devices 86 via communication with the industrial automation control system 78 and/or via communication with the on-premise gateway device 80. For example, the off-premise edge gateway device 82 may access templated data via the on-premise gateway device 80 by way of reference through one or more symbol object instances 54. As such, the off-premise edge gateway device 82 may acquire data from the industrial automation devices 86 using the same symbol object instances 54 used by the on-premise gateway device 80. As a result, the off-premise edge gateway device 82 may connect to the on-premise gateway device 80 via the communicative coupling 102. The off-premise edge gateway device 82 may provide the acquired template data 48 to software applications outside the industrial automation system 10, such as the SaaS/FaaS platform 108 executed on the off-premise computing device 76. The software applications outside of the industrial automation system 10 may then perform real time analysis of the template data 48 within the industrial automation device 86 that has been indirectly acquired via the off-premise edge gateway device 82.

Data generated by the on-premise gateway device 80, the on-premise computing device 74, the off-premise edge gateway device 82, and/or the off-premise computing device 76 may be exchanged among the system 72 to perform additional historical data logging, additional analysis, perform security operations (e.g., authenticating a user), or the like. Template data 48 stored in one or more industrial automation devices 86 and/or in the industrial automation control system 78 may be directly accessed via reference to a combination of a template object instance 42 and a symbol object instance 54, such as [template object instance].[symbol object instance]. To access the template data 48, the off-premise edge gateway device 82, the on-premise gateway device 80, or both, may directly access data of the industrial automation control system 78 and/or of the industrial automation devices 86 via reference to the template object instance 42 and the symbol object instance 54.

In some cases, the off-premise edge gateway device 82 may instantiate a client on the on-premise gateway device 80 to access template data 48 via the on-premise gateway device 80. In this way, the client may improve exchange of data between the industrial automation device 86 and the off-premise edge gateway device 82. The clients 360 may be hardware or software components or a mix of both hardware and software components, that respectively access a service made available by a server as part of a client and server model of computer networks. Clients 360 may send a request to another hardware or software component that accesses a service made available by a server, which may be located outside of the on-premise gateway device 80 and/or the off-premise gateway device 82. The clients 360 may automatically publish data to connected devices and/or services, respectively. Thus, one of the clients 360 may request data from the other client 360 and, upon receipt of the requested data, may publish the requested data via its connection to downstream systems for respective future access by the downstream systems. For example, client 360B may request template data 48 from client 360A and may convert the template data 48 into a data structure usable by the off-premise computing device 76.

The client 360 may enable the off-premise gateway device 82 to directly subscribe to information provided by or stored within the industrial automation device 86, which may reduce an amount of time to communicate data between the gateway devices 80, 82 and/or reduce a number of computing resources used to map generated data to the off-premise edge gateway device 82.

After obtaining the data from the industrial automation device 86, the off-premise computing device 76 and/or the on-premise computing device 74 may log the data in real time to perform historical trending and analysis of the data over time. The off-premise computing device 76 and/or the on-premise computing device 74 may analyze the stored data over time. This process may involve historical trending of the data logged over time. The off-premise edge gateway device 82 and/or the on-premise gateway device 80 may communicate via the network 84 to access a software application and/or to log the data in a database 106. The on-premise computing device 74 may provide one or more software applications 96. The software applications 96 may include monitoring software, data processing software, or the like, such as operational technology (OT) software. The OT software may monitor and detect when processes of the industrial automation system 10 change and, in response to detecting the change, may cause the industrial automation control system 78 to adjust one or more operations to respond to the change. The software applications 96 may analyze operations of the industrial automation system 10 to facilitate increasing production, reducing costs (e.g., reducing downtime by increasing reliability thereby reducing costs associated with downtime), increasing quality of products produced, or the like. The analysis performed by the software applications 96 may occur in real time, in response to real-time evaluated operating conditions, in response to operating conditions retroactively, on a defined periodic basis, in response to an input, such as from a user, or the like. In some cases, one or more of the software applications 96 may monitor equipment and provide updated information on current machine performance of the industrial automation system 10. For example, historian software may be included with the software applications 96 and the historian software may automatically identify, gather, and store real-time process and production information, including data from legacy systems. The software applications 96 may enable operator interaction and viewing of data of the industrial automation system 10 via a GUI. As such, the on-premise gateway device 80 may convert template data 48 into a data structure suitable for visualization on the GUI.

The off-premise computing device 76 may provide one or more software applications corresponding to a SaaS/FaaS platform 108. The SaaS/FaaS platform 108 may perform historical trending services off-site based on data generated by the industrial automation system 10. The SaaS/FaaS platform 108 may correspond to cloud computing and/or server-based computing operations. The SaaS/FaaS platform 108 may be shared among other industrial automation systems 10. Despite being shared, data corresponding to one industrial automation system 10 may be maintained and provided separate from data corresponding to another industrial automation system 10. The off-premise computing device 76 may sometimes use both datasets to compare processes, such as determining an average or expected type of performance for one type of process. In response to data analysis of the off-premise computing device 76, the off-premise computing device 76 may determine an adjustment to implement at the industrial automation devices 86 and may generate a control signal to transmit to the off-premise gateway device 82 for conversion and transmission to downstream devices of the industrial automation system 10, such as the on-premise gateway device 80 and/or the industrial automation control system 78. The off-premise gateway device 82 and/or the on-premise gateway device 80 may convert the control signal into a protocol signal compatible with templates 44 and symbols 46 (e.g., symbolic data operations).

As one example, the off-premise computing device 76 may provide a software-as-a-service and/or a Function as a Service (SaaS/FaaS) platform 108 via the network 84. The database 106 may include any suitable storage device, server, or the like, such as a web server (e.g., a unitary Apache installation), an application server (e.g., unitary JAVA Virtual Machine), and/or a database server (e.g., a unitary relational database management system (RDBMS) catalog). The SaaS/FaaS platform 108 provided by the off-premise edge gateway device 82 may include platforms such as THINGWORX® registered trademark of PTC, Inc., AZURE® registered trademark of Microsoft Corporation, FIIX® registered trademark of Fiix, Inc., INFLUXDB® registered trademark of InfluxData, Inc. or the like. The SaaS/FaaS platform 108 may manage data stored in the database 106 based on data received from the off-premise edge gateway device 82. In some cases, the off-premise computing device 76 may correspond to one or more data centers that may include one or more servers, one or more virtual servers, or the like, that each may be operated on one or more physical computing devices. The network 84 may be any suitable wired or wireless network, such as a network enabled by the Internet or a cloud-based network. The network 84 may be an off-premise network used by the off-premise computing device 76 to transmit data to the off-premise edge gateway device 82. Using this information, the network 84 may route data and instructions between the off-premise computing device 76, database 106, and the off-premise edge gateway device 82. The off-premise edge gateway device 82 may have access to network information used to communicate with the industrial automation control system 78 and/or the on-premise gateway device 80, such as corresponding internet protocol (IP) address, uniform resource locators (URLs), or the like. In some cases, the off-premise edge gateway device 82 may be disposed on-premise of the industrial automation system 10 and be owned by a same entity who owns the on-premise gateway device 80 and have connectivity to the network 84.

As described above, industrial automation-related systems and methods that use symbolic data operations may enable industrial automation device 86 reporting and control even among systems that use different communication formats. The symbolic data operations may involve the industrial automation control system 78, the on-premise gateway device 80, and the off-premise edge gateway device 82 accessing data associated with the one or more industrial automation devices 86 through symbols.

Data associated with the various device-level systems may be accessed by other components of the industrial automation system 10 via the on-premise gateway device 80 (e.g., Linx Enterprise). The on-premise gateway device 80 may be locally connected to one or more industrial automation devices 86, one or more control systems, or a combination of the two, and communicate with the various devices using messages and/or control signals that follow a common industrial protocol (CIP) or other suitable OT communication protocol. The on-premise gateway device 80 may access symbols stored in the industrial automation devices 86 to process read requests as opposed to waiting to receive identifying information about each device and a mapping to the requested data for each device to read the requested data.

Keeping the foregoing in mind, FIG. 3 also illustrates the industrial automation device 86 as including an enhanced symbolic definition 112. The enhanced symbolic definition 112 may include an original symbolic definition 114 and a user symbolic definition 116. The original symbolic definition 114 may be generated prior to the creation of the user symbolic definition (e.g., installation or commissioning of the industrial automation device 86). By using two types of symbolic definitions, deployment of a new industrial automation device 86 may remain consistently defined via templates 44 and symbols 46 while having the ability to be customized further for its specific application once installed. The enhanced symbolic definition 112 may be generated in response to a user input defining the changes or additions to be made. In some cases, the enhanced symbolic definition 112 may be generated in response to a data pipeline between edge computing devices (e.g., gateway devices 80, 82) and the off-premise computing device 76 (or other cloud computing systems) adding metadata to aid in the characterization of the respective data during the transfer of data between portions of the industrial automation system 10. Updated symbolic definitions may improve industrial automation system 10 by reducing a number of operations involved or a complexity in a process to access sensed data or status data generated by or stored at an industrial automation device 86, among other improvements.

Figure 4:
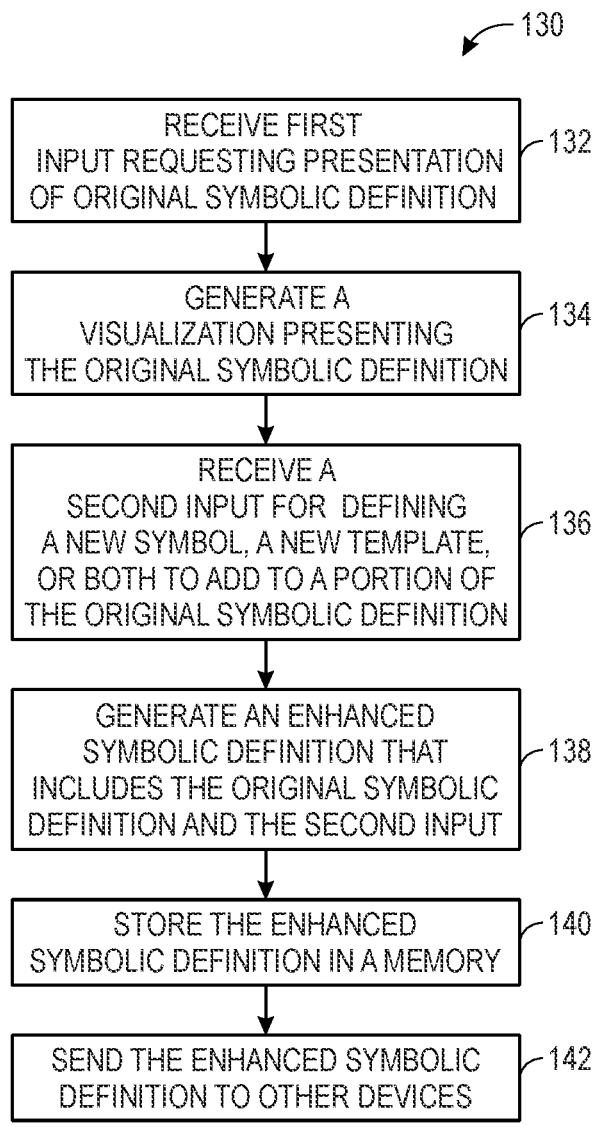
FIG. 4 is a flow diagram of a process for operating a computing device to enhance a symbolic definition based on an input to the computing device, in accordance with an embodiment.
Figure 5:
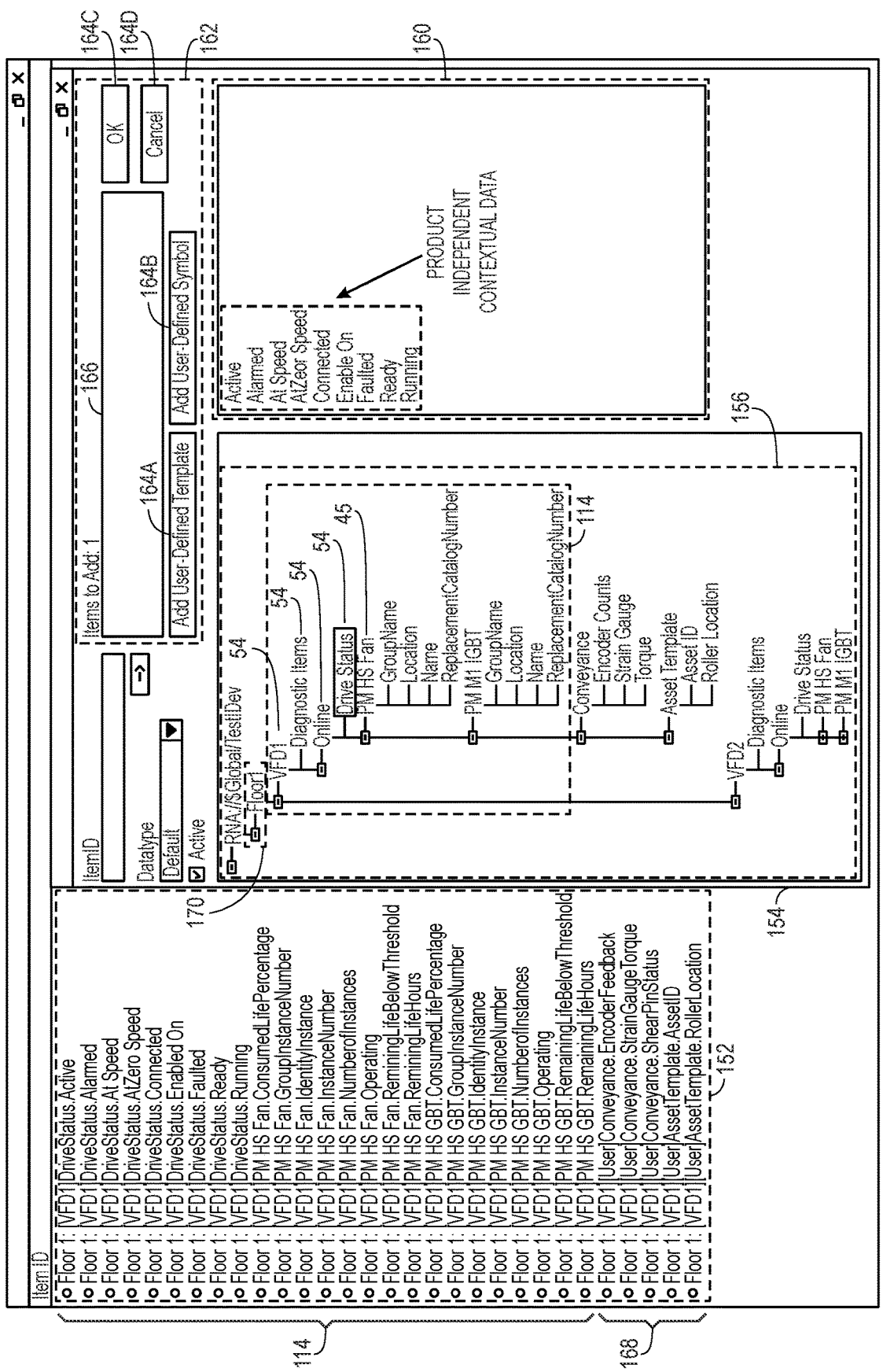
FIG. 5 is an illustration of an example graphical user interface associated with operations of FIG. 4, in accordance with an embodiment.

To elaborate, FIG. 4 is a flowchart of a process 130 for programming the user symbolic definitions 116. Programming the user symbolic definitions 116 may involve various operations of blocks 132-140 and occur based on one or more inputs received via a graphical user interface, such as graphical user interface 150 depicted in FIG. 5. For ease of reference, FIG. 4 and FIG. 5 are described together. The process 130 is described as being performed by the on-premise computing device 74 and it should be understood that substantially similar operations are able to be performed by the on-premise gateway device 80, the off-premise computing device 76, the off-premise gateway device 82, the industrial automation control system 78, local control systems associated with the industrial automation control system 78, such as another control system associated with the industrial automation control system 78, or the like. These operations may be performed in response to processing circuitry of the on-premise computing device 74 executing instructions stored in a tangible, non-transitory, computer-readable medium, such as a memory of the on-premise computing device 74, or another suitable memory. Moreover, the operations of the process 130 are shown in a particular order; however, some of the operations may be performed in a different order than what is presented or omitted altogether.

At block 132, the on-premise computing device 74 may receive a first input that requests that an original symbolic definition 114 is presented. In response to receiving the first input, the on-premise computing device 74 may present a visualization via a graphical user interface (GUI) to display the original symbolic definition 114 via a display device. Indeed, at block 134, the on-premise computing device 74 may generate a visualization that includes an indication of the original symbolic definition 114. The visualization may correspond to the graphical user interface (GUI) 150 of FIG. 5. For example, in FIG. 5, the GUI 150 includes an indication of the original symbolic definition 114 in a listing data structure 152 (e.g., first data structure) and an indication of the original symbolic definition 114 in a nested data structure 154 (e.g., second data structure).

The GUI 150 may present symbolic definitions and a data structure of example instances of the various symbolic definitions. Various industrial automation devices 86 (e.g., standard device, connected device, smart device) may expose data according to the symbol object instances 54 and template object instances 42, such that the on-premise gateway device 80 and/or the off-premise edge gateway device 82 may be able to view common data (e.g., subset of common data 156) that may be exposed across a portfolio as depicted in the GUI 150. In some embodiments, the common data 156 may be exposed according to a device data model, which may include template object instances 42 representing categories of information such as identity, state, runtime, maintenance, and sustainability. By storing the data in this format, communication with a local or intermediate controller within devices may not be required for other devices connected to the on-premise gateway device 80 or the off-premise edge gateway device 82 to access or view the data stored in the devices. Moreover, the device seeking or requesting the common data 156 from the devices storing a portion of the common data 156 do not require prior knowledge of individual product parameters or object instance models. Instead, the common data 156 (e.g., data corresponding to exposed or referenceable symbol object instances 54 and template object instances 42) may be viewable by the respective device. As a result, the namespace of the devices may be correlated with namespaces used by other devices.

The GUI 150 illustrates a unit hierarchy (e.g., "Floor 1" indication 170), where the different symbols are grouped based on the context data that each are related to a same floor of a unit 14. Floor 1 includes two industrial automation devices 86—a first variable frequency drive (e.g., symbol object instance 54 "VFD 1") and a second variable frequency drive (e.g., symbol object instance 54 "VFD 2"). Both variable frequency drives are represented as respective symbol object instances 54 corresponding to nested template object instances 42. However, the templates 44 and symbols 46 used to represent the variable frequency drives are the same and may be respectively implemented as separate instances to represent the different variable frequency drives. For example, the "diagnostic items" symbol 46 corresponds to data associated with "diagnostic items" and is respectively implemented as two symbol object instances 54 for each symbol object instance 54 references to a nested template object instance 42 that characterizes data associated with determining an "online" status, such as a "motor status" symbol object instance 54, a symbol object instance 54 that references to a "PM HS Fan" nested template instance (that includes its own symbol object instances 54), and a symbol object instance 54 referencing to a "PM M1 IGBT" nested template instance (that includes its own symbol object instances 54).

The industrial automation control system 78 may associate both the first variable frequency drive and the second variable frequency drive with a same device type, which may result in the same template 44 being referenced when registering the devices to the industrial automation system 10. In this GUI 150, the "drive status" symbol object instance 54 of the first variable frequency drive is selected and different data options are shown in a graphical display region 160. Based on one or more other reported symbol statuses, the "drive status" symbol object instance 54 may change in value between the different data options of region 312, such as by a local control system of the industrial automation device 86 (or of Floor 1) updating the reported value over time.

With this in mind, referring back to FIG. 4, at block 136, the on-premise computing device 74 may receive a second input corresponding to a portion of the original symbolic definition 114. The second input may define a new symbol, a new template 44, or both to add to the original symbolic definition 114. The second input may identify a type of one or more child devices that were added to the industrial automation device 86 that now are to be added to a symbolic definition of the industrial automation device 86 (e.g., corresponds to an addition of one or more child devices to the industrial automation device 86). Referring again to FIG. 5, the second input may be received via one or more input graphics 162 configurable to receive an indication of an input or a selection (e.g., input button 164A, input button 164B, input button 164C, input button 164D, input field 166). The second input may be a user input or a signal input generated by a device external to the on-premise computing device 74, such as the off-premise computing device 76, the industrial automation control system 78, or the like. Indeed, the GUI 150 may give a user an opportunity to add, during run-time, an additional profile to a symbolic configuration of one or more industrial automation devices 86. The GUI 150 may receive an input that may cause the on-premise computing device 74 to create, as the additional profile (e.g., user symbolic definition 116), a set of templates 44 and symbols 46 associated with a configuration of an industrial automation device 86 in response to the input. For example, the on-premise computing device 74 may create an asset template, a conveyance template, or the like, where each may have target symbols defined, in response to the second input received at block 136.

Returning to FIG. 4, at block 138, the on-premise computing device 74 may generate an enhanced symbolic definition 112 that includes the original symbolic definition 114 and the second input (e.g., user symbolic definition 116). In FIG. 5, the enhanced symbolic definition 112 may correspond to data structure indications 168 of the user symbolic definition 116 combined with data structure indications corresponding to original symbolic definitions 114. FIG. 5 may illustrate a generated GUI 150 where operations of this block 138 have already been performed.

At block 140, the on-premise computing device 74 may store the enhanced symbolic definition 112 in a storage component or memory of the on-premise gateway device 80. That is, the on-premise computing device 74 may write or associated the enhanced symbolic definition 112 to data accessible to the on-premise gateway device 80. In turn, the on-premise gateway device 80 may send the enhanced symbolic definition 112 to one or more industrial automation devices 86, the off-premise edge gateway device 82, the industrial automation control system 78, or the like, such that those devices may characterize data according to the enhanced symbolic definition 112. In some cases, the enhanced symbolic definition 112 may replace or supplant the original symbolic definition 114 used in one or more of those systems.

After the user symbolic definition 116 is associated with the original symbolic definition 114, symbolic operations described above may be performed using the original symbolic definition 114 as well as with the user symbolic definition 116. For example, after data is accessed by the industrial automation device 86, the on-premise gateway device 80, the off-premise gateway device 82, the off-premise computing device 76, the on-premise computing device 74, the industrial automation control system 78, or the like, the respective device may discover the additional symbolic definitions (e.g., user symbolic definition 116) to provide to the requesting device. In some embodiments, the enhanced template object instance 42 associated with the enhanced symbolic definition 112 may be stored in memory, such as with the device data templates 92 in the storage 88. After being stored in a memory, the template object instance 42 may be accessed later by the industrial automation devices 86, the on-premise gateway device 80, the off-premise edge gateway device 82, and/or a control system (e.g., industrial automation control system 78) and used to decode a dataset also being accessed by that device (e.g., the industrial automation device 86, the on-premise gateway device 80, the off-premise edge gateway device 82, the industrial automation control system 78).

Figure 6:
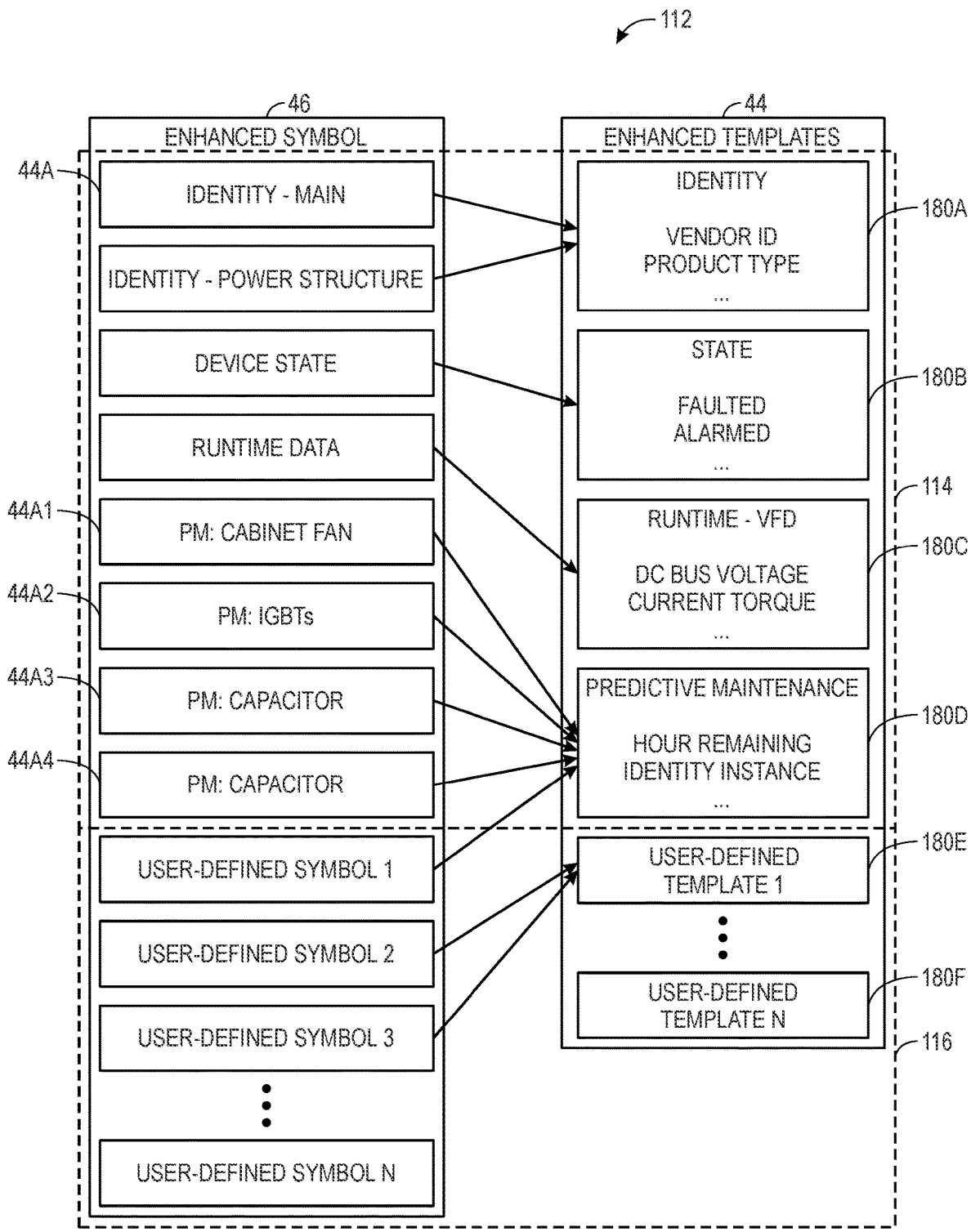
FIG. 6 is a block diagram of example templates and symbols stored in firmware of one or more industrial automation devices of the industrial automation system of FIG. 1, in accordance with an embodiment.

To elaborate further on symbolic data-based operations, FIG. 6 is a block diagram illustrating enhanced symbolic definitions 112 including example categories of symbols 46 that may be associated with the industrial automation system 10 that may be included with the device data templates 92 once user-defined templates 44 and user-defined symbols 46 are added to original templates 44 and original symbols 46. By using enhanced templates 44 and enhanced symbols 46, references to the data may be made directly to a template dataset of a particular industrial automation device 86 as opposed to traditional class, instance, and attribute (CIA) lookup operations, yielding relatively more efficient methods of data processing tailored to a system-specific use of the industrial automation device 86 while also reducing computing resources that may be used to perform the CIA lookup operations. Moreover, these symbolic data operations may further improve control system operations by standardizing systems and methods used to access data generated by industrial automation devices 86, making it easier to access the data when commissioning one or more devices, updating a process of the industrial automation system 10, or the like while also remaining flexible in individual application to respective industrial automation devices 86 (e.g., able to be customized further on a device-level or nested, child device-level).

Here, the categories 180 correspond to an Identity category 180A, a State category 180B, a Runtime category 180C, a Maintenance category 180D (e.g., predictive maintenance), and user defined categories 180E-180F. It should be understood that other different and/or additional categories, or combination of categories may be used, including fewer categories than those listed are contemplated. The various categories 180 may characterize a referenced template dataset from objects (e.g., symbol object instances 54, template object instances 42) without being an object itself. The characterization of a template 44 dataset or a symbol object instance 54 into a category of the categories 180 may be inherited from a template 44. One or more of the industrial automation devices 86 may use symbol-template models to enable symbol/template data access to control systems or interfacing devices, such as the industrial automation control system 78, the on-premise gateway device 80, and/or the off-premise edge gateway device 82. For example, the industrial automation device 86 may receive data associated with its own operation, process the received data to determine a category of a symbol within a template instance of the symbol 46, and store the data based on the determined category into template data 48 stored in some memory component. These symbol-template models may be enhanced by site-specific information to generate enhanced symbolic definitions with improved suitability for the specific system, portion of system, component, industrial application, or the like.

Referring to FIG. 3 and FIG. 6, the enhanced symbolic definition 112 may correspond to an enhanced symbol 46 and an enhanced template 44. The original symbolic definition 114 may be a combination of symbols 46 and templates 44 used to define a system-generic representation of an industrial automation device 86 while the user symbolic definition 116 may enhance the system-generic representation into a system-specific representation of the industrial automation device 86.

For example, for a given type of industrial automation devices 86, a certain combination of symbols 46 and templates 44 may be installed prior to initial commissioning (e.g., during manufacturing) into an industrial automation system 10. After a given industrial automation device 86 is installed and initially commissioned in the industrial automation system 10, user-defined symbols 46 and user-defined templates 44 may be used to customize the given industrial automation device 86 to that industrial automation system 10. Thus, the industrial automation device 86 may receive a configuration and update stored symbols 46 and templates 44 based on the configuration to apply the changes associated with the user-defined symbols 46 and user-defined templates 44. Although described herein as "user-defined," it is noted that any suitable computing device may generate an input indicative of additional symbols 46 and/or templates 44 to be added to a respective industrial automation device 86.

To elaborate further, each of the categories may correspond to different templates 44 for different data. For example, when being used to describe the industrial automation device 86, the Identity category 180A may correspond to symbol objects instances referencing vendor identifier data that indicates the vendor from which the industrial automation device 86 was purchased, such as serial number data, firmware information data, warranty information data, or the like. A reference to this data, such as the warranty information, may be made at a relatively higher-level control system communicatively coupled to industrial automation devices 86, as opposed to the industrial automation device 86.

Other categories include a State category 180B, a Runtime category 180C, and a Maintenance category 180D. The State category 180B may correspond to symbol object instances 54 referencing present state data of the industrial automation device 86 (or at least a state of the industrial automation device 86 at a time of most recent reporting), where different examples of potential states include "running," "stopped," "faulted," and "alarmed." Other states may be used for different types of industrial automation devices 86. The Runtime category 180C may correspond to symbol object instances 54 referencing present operating parameter data, such as data collected during runtime. For example, the Runtime category 180C may correspond to symbol object instances 54 referencing current data (e.g., in Amps) of the industrial automation device 86, voltage data of the industrial automation device 86, torque data of the industrial automation device 86, velocity data of the industrial automation device 86, and/or temperature data of the industrial automation device 86, or any suitable combination of measurable parameters. The Maintenance category 180D may correspond to symbol object instances 54 referencing data related to predictive maintenance metrics of the industrial automation device 86. For example, the Maintenance category 180D may correspond to symbol object instances 54 referencing data indicative of a number of running hours of the industrial automation device 86, to data indicative of an expected fan life remaining of a fan of the industrial automation device 86, to data indicative of an expected hardware component (e.g., IGBT) life of the industrial automation device 86, to data indicative of a time remaining to live metric of the industrial automation device 86, and/or to data indicative of a count of a total number of motor starts performed over time for the industrial automation device 86. These values together or alone may help quantify (e.g., quantifies) an amount of operational time remaining of the industrial automation device 86.

Instances of the templates 44 may organize data associated with the different industrial automation devices 86 into different categories of symbols 46 as different array elements. The template 44 may be associated with symbols 46 to enable symbolic access to global-level data and local-level data associated with an industrial automation device 86. Symbols 46 may be one instantiation of a template object instance 42 and correspond to array elements to organize data or references to additional nested templates. Multiple symbols 46 can be referenced by the same template instance, such as, for example, each predictive maintenance symbol 46A (e.g., symbol 46A1, symbol 46A2, symbol 46A3, and symbol 46A4) in the diagram may reference the same Maintenance category 180D (e.g., predictive maintenance (PM) template object). The symbols 46 and the template 44 may be a vendor specific common industry protocol (CIP) object. The different categories of symbols 46 may also include sub-categories of symbols 46. When a template instance includes a nested symbol sub-category, the symbol 46 of a parent template instance may reference a nested template instance, and thus the array element for the symbol 46 may include information indicative of the nested template instance to redirect to reference the second template instance. When a parent device (e.g., the device represented via the symbols 46 of FIG. 1) has nested devices, such as an associated fan, an associated capacitor, a contactor, and an insulated-gate bipolar transistor assembly (IGBT), then the nested devices may also be represented as symbols 46. For example, the nested devices are included as symbols 46A1-A4 associated with the Maintenance category 180D. Industrial components designed to incorporate symbolic data operations may thus have the additional technical improvement of being able to have sub-component template structures nested under the parent's device template structure, leading to an enhanced representative data structure that enables the parent device to self-report its nested devices when initially installed into the industrial automation system 10 and when the nested devices are reporting data. Having the parent device self-report nested devices may improve operational reliability and reduce downtime by reducing a likelihood of operator error and making maintenance operations and installation operations more efficient by reducing a number of control commands used to install a device into an industrial automation system 10, thereby reducing computing resources consumed to do so. The ability to nest symbols 46 and templates 44 may also apply to user defined symbols 46 and templates 44 associated with the user symbolic definition 116.

Each instance of the template 44 allocates memory in a consistent manner between different devices to help standardize data access. The instances may allocate memory according to the different categories of data able to be stored within the instance. The templates 44 (e.g., original and additional) may be shared across an enterprise product offering via the device data templates 92, thereby providing control circuitry consistent and uniform access to the stored data according to its classification.

Figure 7:
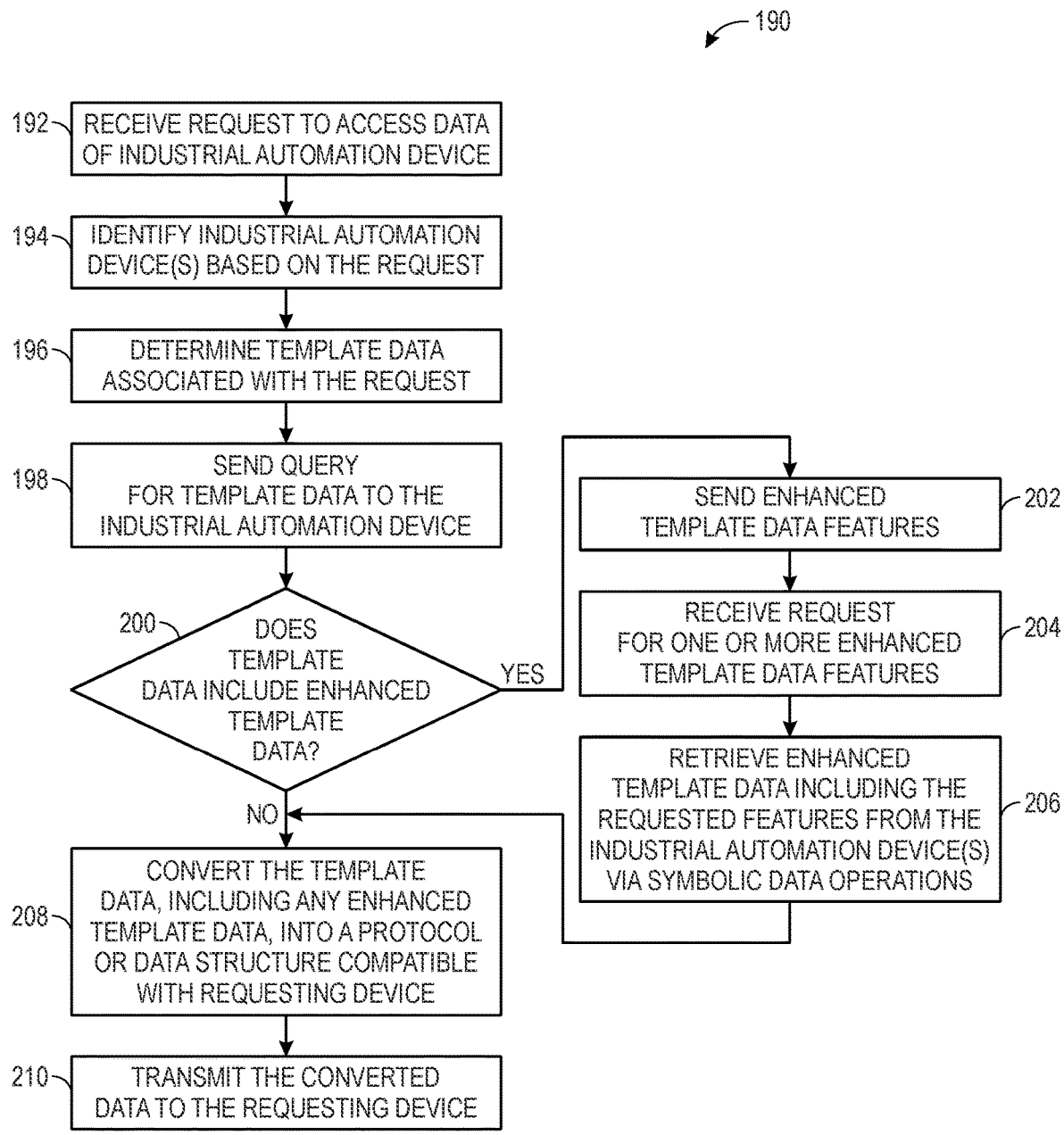
FIG. 7 is a flow diagram of a process for operating a computing device to perform a data access operation via an edge device, in accordance with an embodiment.

Keeping the foregoing in mind, FIG. 7 is a flow diagram of a process 190 for operating the on-premise gateway device 80 to perform a data access operation based on enhanced symbolic definitions. Although the process 190 is described as being performed by the on-premise gateway device 80, these operations may be performed in response to processing circuitry of the on-premise gateway device 80 executing instructions stored in a tangible, non-transitory, computer-readable medium, such as a memory of the on-premise gateway device 80, or another suitable memory, or by another processing device, such as the off-premise gateway device 82, the off-premise computing device 76, the on-premise computing device, and/or the industrial automation control system 78. Moreover, the operations of the process 190 are shown in a particular order; however, some of the operations may be performed in a different order than what is presented or omitted altogether.

At block 192, the on-premise gateway device 80 may receive a request to access data of the industrial automation device 86. The request may originate from a requesting device, such as a control system of the on-premise gateway device 80, a control system of the on-premise computing device 74, a connected application (e.g., software application 96, SaaS/FaaS platform 108), or from an off-premise device, like the off-premise computing device 76. The device generating the request may be "blind" to symbolic data operations of the industrial automation system 10. Thus, the on-premise gateway device 80 may operate on a boundary between symbolic data access and non-symbolic data access. The on-premise gateway device 80 may process the request and coordinate acquisition of the desired data indicated via the request.

At block 194, the on-premise gateway device 80 may identify one or more industrial automation devices 86 based on the request received at block 192. The request may indicate a subset of industrial automation devices 86, a type of industrial automation devices 86, or the like. That is, the request may include an address, an indication of a target component, or the like within a data packet providing the request. In some embodiments, the request may include an indication of a condition or a parameter, which may be used to query a list of the industrial automation devices 86 accessible via the on-premise gateway device 80 stored in storage 88. The query may be based on information included or indicated by the request. The on-premise gateway device 80 may query the storage 88 to determine one or more industrial automation devices 86 identified via the request as desired to obtain related data. The query may result in query results being generated. From the query results, the on-premise gateway device 80 may identify the one or more industrial automation devices 86 based on the request. For example, the request may specify, as a query condition, that data is desired for "all motor drives," data is desired for "current data from unit 2 circuit breakers," or the like. The request indicating "all motor drives" may cause the on-premise gateway device 80 to search the storage 88 for indications of each motor drive of the industrial automation system 10. The request indicating "current data from unit 2 circuit breakers" may cause the on-premise gateway device 80 to search the storage 88 for indications of each circuit breaker physically disposed in a unit 14 corresponding to "unit 2."

At block 196, the on-premise gateway device 80 may determine template data 48 associated with the request received at block 192. The template data 48 may be data stored by the devices identified at block 194, such as devices identified based on the query of the storage 88 using search terms indicated via the request. In some embodiments, the on-premise gateway device 80 may identify or determine template data 48 associated with the request based on information provided in the request itself. For example, the template data 48 may be specifically called out by name or determined based on an input into a data field (e.g., selection or input of an indication of an option via a field with any number of set options) corresponding to the request.

However, if the request does not specify the template data 48, the on-premise gateway device 80 may access a mapping that details relationships between a number of devices, device types, and the like and corresponding template datasets. That is, the request received at block 192 may include template data 48 but it may also lack template data 48 if the device sending the request is unfamiliar or incompatible with symbolic data-based operations. In this case, the on-premise gateway device 80 may consult the mapping to determine a corresponding template data 48 that matches the information (e.g., requested data) provided in the request received at block 192. As such, the mapping may be predefined for a number of devices, device types, types of requests, and the like.

In some cases, the on-premise gateway device 80 may use machine learning or process tracking operations to identify suitable corresponding template data 48 over time based on previous requests or operational analysis. That is, the on-premise gateway device 80 may receive a request lacking a specified template data 48 and monitor the resulting data used to facilitate the request. The data provided in response to the request may be selected by a user via the industrial automation device 86 that is associated with the requests of block 192 or provided automatically from the industrial automation device 86. For instance, the on-premise gateway device 80 may forward the request to the specified industrial automation device 86 in its native format and protocol. As such, the on-premise gateway device 80 may receive a response from the industrial automation device 86 in the same format. In some cases, a user or expert may associate an existing template dataset to the received response and the on-premise gateway device 80 may store the association in the mapping. In some cases, the on-premise gateway device 80 may receive the response and query the mapping to identify a similar data structure or set of data that matches the received response. Here, the on-premise gateway device 80 may associate any identified match as the corresponding template data 48. The automatic identification process may be verified by a user input or some other suitable confirmation process. In any case, the on-premise gateway device 80 may determine a combination of process states and/or data values that resulted in the on-premise computing device 74 requesting a particular portion of template data 48. As a result, the on-premise gateway device 80 may employ machine learning or process tracking operations to determine the template data 48 associated with the request received at block 192.

At block 198, the on-premise gateway device 80 may send a query to an industrial automation device 86 for the template data 48 determined at block 196. The query may involve the on-premise gateway device 80 and/or the industrial automation control system 78 accessing the desired template data 48 stored in the industrial automation device 86 using symbolic data operations. For example, the on-premise gateway device 80 may access template data 48 via a combination of a template object instance 42 and a symbol object instance 54 (e.g., "example 1 template object instance. symbol object instance").

Based on querying the template data 48, at block 200, the on-premise gateway device 80 may receive template data 48 from the industrial automation device 86 and determine whether the template data 48 includes enhanced template data. The query for the template data 48 may be made using symbolic data operations and thus may directly enable the on-premise gateway device 80 to read the template data 48 from memory of the industrial automation device 86. When querying for the original template data 48 corresponding to the original template 44, the industrial automation device 86 may return template data 48 corresponding to an enhanced template data. After the industrial automation device 86 determines that the template data 48 returned in response to the query of block 198 includes enhanced template data, the industrial automation device 86 may perform operations of blocks 202-206. Otherwise, the industrial automation device 86 may proceed to block 208.

At blocks 202-206, the industrial automation device 86 may determine whether the requesting device is requesting some or all of the enhanced template data. To do so, at block 202, the industrial automation device 86 may send an indication of enhanced template data features to the requesting device of block 192. Responsive to the sent indication, the requesting device may respond with an indication of data features (e.g., some or all) of the enhanced template data, and thus at block 204, the industrial automation device 86 may receive a request for one or more enhanced template data features. At block 206, the industrial automation device 86 may retrieve enhanced template data including the requested features from block 204 via symbolic data operations. Now having the template data 48 and the additional enhanced template data, the industrial automation device 86 may proceed to block 208.

At block 208, the on-premise gateway device 80 may convert the template data 48, including any enhanced template data retrieved at block 206, into a protocol compatible with the requesting device that generated the request received at block 192. In some cases, the on-premise gateway device 80 may convert the template data 48 from a first protocol into a second protocol and later into a third protocol, such as when the starting and ending locations of the data are different. The template data 48 may be converted into converted data suitable for processing by the requesting device. The on-premise gateway device 80 may convert the template 44 into a protocol used to receive the request at block 192.

At block 210, the on-premise gateway device 80 may transmit the converted data to the requesting device. In some cases, the converted data may be transmitted within or with the original request. Upon receiving the converted data, the requesting device may store the converted data or further process the converted data, such as to analyze an operation of the industrial automation system 10 and/or interpret the converted data to obtain insight into the operation of the industrial automation system 10.

As discussed above, when determining the template data 48 associated with the request and/or when processing the enhanced template data, the on-premise gateway device 80 may access a mapping between the requesting device and the target template data 48 (including any targeted enhanced data) when determining what template data 48 to request. The mapping may define a previously determined data request by the requesting device for the template data 48. Storage of the on-premise gateway device 80 or storage 88 may store the mapping. The mapping may be a predefined mapping between the template data 48 and the requesting device, such that when first template data 48 is requested, the on-premise gateway device 80 and/or the off-premise gateway device 82 determines to access both the first template data 48 and second template data 48 based on an association between the template data 48 indicated via the mapping. Artificial intelligence or machine intelligent algorithms may generate the mapping overtime based on use of the industrial automation system 10 or user specifications. For example, a mapping may be a type of a context that defines a relationship between dataset A and datasets B and C, and thus the on-premise gateway device 80 may acquire dataset B along with dataset C when facilitating a request for dataset A based on the mapping. Other methods may be used to generate the mappings.

It is further noted that in some cases, the on-premise gateway device 80 may default to transmitting the enhanced template data when present and thus some or all of the operations of blocks 200-206 may be omitted. By checking whether the requesting device wants the enhanced template data, a likelihood of data clipping occurring may reduce by mitigating the potential for data set to a system not ready or capable of processing the size or type of data. In some cases, the conversions operations of block 208 compensate for structural-based data losses that could occur by restructuring data sets that include enhanced template data to be compatible with legacy communication paths.

Figure 8:
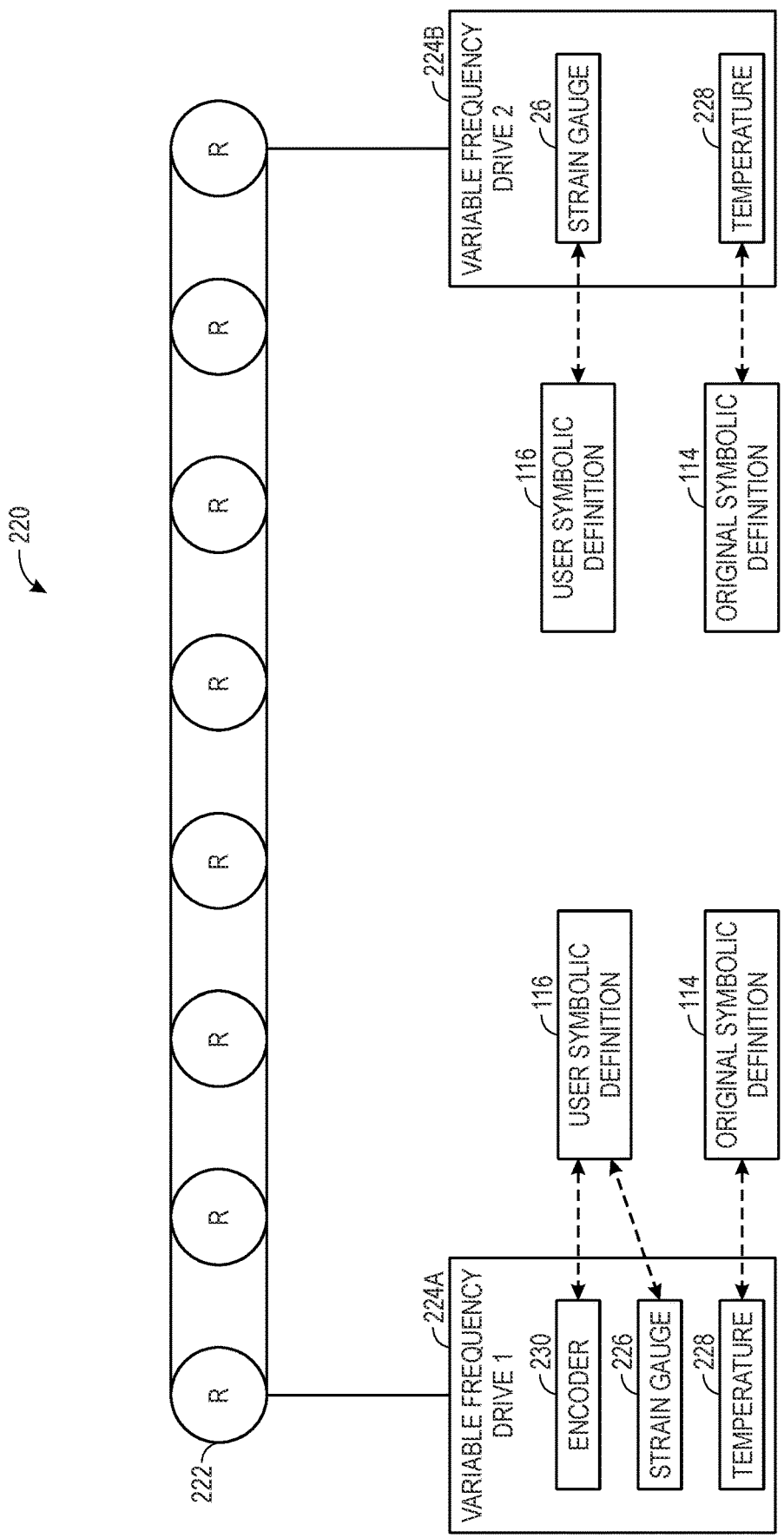
FIG. 8 is a diagrammatic representation of an example conveyor system that implements enhanced symbolic definitions, in accordance with an embodiment.

Discussing now a specific example, FIG. 8 is a block diagram illustrating a conveyor system 220 that includes rollers 222 and variable frequency drives 224 (variable frequency drive 224A, variable frequency drive 224B). Each variable frequency drive 224 may include a strain gauge 226, a temperature sensor 228, and an encoder 230. The temperature sensors 228, the strain gauges 226, and/or the encoder 230 may be part of a control feedback loop.

The variable frequency drives 224 may be characterized according to an original symbolic definition 114 and a user symbolic definition 116 that corresponds to respective instances of symbols 46 and templates 44. In this way, the industrial automation control system 78 may have received a first symbol object instance 54 corresponding to the original symbolic definition 114 at a first time and, after one or more components or operational changes were made to the variable frequency drives 224, may have received a second symbol object instance 54 or a second input corresponding to the user symbolic definition 116 used to append or adjust the original symbolic definition 114 to account for the change. This may enable the industrial automation control system 78 and the variable frequency drives 224 to reference a same structure that represents a real-time configuration of the variable frequency drives 224 when generating enhanced template data. By way of example, the original symbolic definition 114 may include an original symbolic definition associated with the temperature sensor 228. If the encoder 230 and/or the strain gauges 226 are not generic devices associated with the variable frequency drive 224, they may be considered application or installation specific devices. As such, user symbolic definitions 116 may be used to supplement the original symbolic definition 114 with application or installation specific devices. Once added, the user symbolic definitions 116 may be transmitted along with the original symbolic definitions 114 when sending data back via symbolic data access operations. Other examples of additional symbolic definitions include being appended to original symbolic definitions 114 when generating the enhanced symbolic definitions 112 to include encoder feedback, strain gauge torque, roller location, shear pin status, and asset identifiers.

Without use of the additional symbolic definitions (e.g., user symbolic definitions 116, other symbolic definitions not included in the original symbolic definitions 114), a requesting device may search an entire namespace dataset associated with the conveyor system 220 to parse through the various sets of data to obtain desired dataset of the encoder 230, the strain gauges 226, or another child device of one or both of the variable frequency drives 224. However, by appending the additional symbolic definitions to existing, original symbolic definitions 114, the requesting device may use symbolic data access operations to directly access the additional symbolic definitions without having to parse each data point outside the original symbolic definitions 114.

Keeping the foregoing in mind, it is noted that the industrial automation devices 86 (e.g., new devices, existing devices) may include sensors that generate data, such as status data and/or sensing data. An industrial automation device 86 receiving this generated data may store the data in its template data via symbol object instances 54 for later access. The new industrial automation device 86 of FIG. 8 may wait until being registered to the industrial automation control system 78 before storing generated data, or in some cases may log the data into the template data 48 via the symbol object instances 54 as part of retroactive data logging operations. Indeed, an industrial automation device 86 may have a data source (e.g., sensor) already connected to (e.g., referencing) its symbol object instance 54 prior to a request for data from a client tool, such as a gateway (e.g., on-premise gateway device 80, off-premise edge gateway device 82) and/or the industrial automation control system 78. The industrial automation device 86 may know where to place the data of the data source in the template data 48 based on the structure of the enhanced template object instance 42, which represents the aggregated category corresponding to the data from the data source (e.g., whether the data corresponds to identity, sustainability, status, and so on).

In some cases, the on-premise gateway device 80 may use machine learning or process tracking operations to identify suitable corresponding template data 48 over time based on previous requests or operational analysis. Enhanced symbolic definitions 112 may be generated based on the previous requests or operational analysis. That is, the on-premise gateway device 80 may receive a request lacking a specified template data 48 and monitor the resulting data used to facilitate the request. The data provided in response to the request may be selected by a user via the industrial automation device 86 that is associated with the requests or provided automatically from the industrial automation device 86. For instance, the on-premise gateway device 80 may forward the request to the specified industrial automation device 86 in its native format and protocol. As such, the on-premise gateway device 80 may receive a response from the industrial automation device 86 in the same format. In some cases, a user or expert may associate an existing template dataset to the received response and the on-premise gateway device 80 may store the association in the mapping. In some cases, the on-premise gateway device 80 may receive the response and query the mapping to identify a similar data structure or set of data that matches the received response. Here, the on-premise gateway device 80 may associate any identified match as the corresponding template data 48. The automatic identification process may be verified by a user input or some other suitable confirmation process. In any case, the on-premise gateway device 80 may determine a combination of process states and/or data values that resulted in the on-premise computing device 74 requesting a particular portion of template data 48. As a result, the on-premise gateway device 80 may employ machine learning or process tracking operations to determine the template data 48 associated with the request received at block 192.

It is noted that the off-premise edge gateway device 82 may receive and process requests from a requesting device coupled downstream from the off-premise computing device 76. In this way, a request from the requesting device may pass through the off-premise computing device 76 to be received by the off-premise edge gateway device 82. Thus, the off-premise edge gateway device 82 may process the template data 48 according to specifications (e.g., protocol and/or data structure) of the requesting device and/or a program executed via the requesting device as opposed to the off-premise computing device 76.

Keeping this in mind, the client 360B may also convert and process data into template data 48 or and/or may convert and process template data 48 from the industrial automation system 10 into a data structure and data protocol combination compatible with systems and methods used by the requesting device, and vice versa. These operations may apply similarly to original symbolic definitions 114 and the enhanced symbolic definitions 112. Sometimes the specifications of the off-premise computing device 76 matches that of the downstream requesting device and in other time the specifications are different. This may involve a technical improvement by enabling the off-premise edge gateway device 82 to be a highly flexible system able to communicate with a wide variety of computing devices, including those coupled downstream from intermediary devices. The off-premise computing device 76 may request the template data 48 via the off-premise edge gateway device 82 but the template data 48 received by the off-premise edge gateway device 82 may be part of an array structure and protocol incompatible with a data structure and protocol used by the off-premise computing device 76 (e.g., if defined as so by the template object instance 42). For example, the off-premise edge gateway device 82 via the client 360B may detect that the template data 48 is arranged in a single column, multiple row data structure and may convert the template data 48 to data arranged in a multiple page, multiple column, and multiple row data structure compatible with the off-premise computing device 76. This conversion may occur based on the information about the template data 48 from a corresponding template object instance 42 for the template data 48. For example, the template object instance 42 may indicate a respective format of each portion of the template data 48 and may provide a context regarding that portion of the template data 48 to indicate to the off-premise gateway device 82 how to place the data (e.g., converted template data 48) within the data structure for use by the off-premise computing device 76. Thus, the off-premise computing device 76 may convert the template data 48 into the data structure and protocol used by the requesting device or a compatible data structure and protocol. These operations may involve the off-premise edge gateway device 82 converting the template data 48 to data, and then converting the data to a data structure compatible with the industrial automation devices 86 and/or the off-premise computing device 76. When doing so, the off-premise edge gateway device 82 may combine some or all of the template data 48 from different industrial automation devices 86 into the same generated data structure. The off-premise edge gateway device 82 may populate an existing data structure with the data converted from the template data 48 and/or may generate a new data structure to be populated with the data converted from the template data 48. The new data structure may be received by the off-premise computing device 76 and saved over some or all of an existing data structure. In some cases, the client 360B may automatically store the resulting data structure (from the converted template data 48) in the off-premise computing device 76.

In some embodiments, the data structure transmitted from the off-premise computing device 76 to the requesting device may include a subset or all of the enhanced template data from the industrial automation devices 86 identified at block 414. The off-premise computing device 76 may determine from the data structure used by the requesting device which of the enhanced template data to convert and transmit to the requesting device. The off-premise computing device 76 may access the data structures used by the requesting device to make the determination of subset of template data 48 and/or the off-premise computing device 76 may receive an indication of the data structure from the requesting device. In some cases, the off-premise computing device 76 may access an indication in memory that defines which of the template data 48 is to be transmitted to the requesting device.

Data transmitted between the off-premise computing device 76 and the industrial automation system 10 may be exchanged wirelessly or via wired connection. The off-premise computing device 76 may receive data directly from the industrial automation system 10 via the industrial automation control system 78. In some cases, the off-premise computing device 76 may receive data from a client-to-client connection between clients 360. Furthermore, sometimes the off-premise computing device 76 may receive data from the industrial automation devices 86 via the on-premise gateway device 80. In any of the cases, one or more of the clients 360 may be bypassed or additional clients may be included and used in the communications.

In some cases, one or more of the industrial automation devices 86 may update stored enhanced template data in response to implementing a control command, such as a control command generated by the on-premise gateway device 80. Other systems may generate the control command, such as the industrial automation control system 78 and/or the off-premise gateway device 82. The update to the template data 48 may occur in response to sensing data being stored as at least a portion of the template data 48, overwriting some amount of previously stored data. In this situation, the off-premise gateway device 82 may, after sending the data structure to the requesting device at block 426, determine that the template data 48 was updated by the industrial automation device 86 and generate an updated data structure based on the updated template data 48 in response to determining that the template data 48 was updated. Then, the off-premise gateway device 82 may transmit the updated data structure the requesting device to autonomously update the data stored or referenced by at least a portion of the requesting device. This update operation may occur without further intervention or without an additional request being issued (e.g., an additional request similar to the request of block 412).

In some cases, the industrial automation device 86, in response to being initially powered-on and communicatively coupled to the industrial automation control system 78 via a communication network, may report its own nested devices without further intervention from a control system. This reporting may update to include different information over time as original symbolic definitions 114 are appended to generate enhanced symbolic definitions 112. The industrial automation device 86 may do so by reporting a template object instance 42 preloaded into the industrial automation device 86 and, at a later time, updating the template object instance 42 based on an input or configuration from the industrial automation control system 78. Sometimes, the industrial automation control system 78 may receive an instruction to power on the industrial automation device 86 and the industrial automation device 86, in response to being powered on, reports the nested devices and/or changes associated with an enhanced symbolic definition 112. Some industrial automation devices 86 may not auto-report nested devices and/or changes associated with an enhanced symbolic definition 112. These devices may report nested devices and/or changes associated with an enhanced symbolic definition 112 in response to an instruction or a control signal from the industrial automation control system 78 instructing to do so. In any case, the industrial automation control system 78 may update corresponding information stored in association with the industrial automation device 86 in response to receiving an indication of the nested devices and/or changes associated with an enhanced symbolic definition 112 from the industrial automation device 86. Sometimes, the industrial automation control system 78 may commence registration of the industrial automation device 86 in response to receiving the indications of the nested devices via the reporting.

Operations of FIGS. 4-8 were described above with reference to adjusting the symbolic definitions based on a user input. It should be understood that similar additions or adjustments to the original symbolic definition 114 may be made by the industrial automation control system 78, the computing devices 74, 76, and/or the gateway devices 80, 82, such as to provide additional context for another portion of the industrial automation system 10, the open platform 104 communication systems, and/or the SaaS/FaaS platform 108. For example, one or more edge devices, like the gateway devices 80, 82, may receive data from industrial automation devices 86. The edge devices may add metadata to the data via an additional symbolic definition to provide context for the data to enable the cloud computing system to have a better understanding of the data and any devices associated with the data. For example, data may be tagged to indicate a process associated with the data, which device or devices are associated with the data, units for the data, or any other context for the data. A data historian could also be utilized in conjunction with the pipeline to add more context, for example, by adorning objects with an adjusted symbolic definition (e.g., similar to the user symbolic definition and generated independent of some user input) as more and more data is generated by a process or processes in an industrial automation system 10. With this in mind, references to "user-defined symbol," "user-defined template," and/or "user symbolic definition," among others, may sometimes be replaced generally with "device-defined symbol," "device-defined template," and/or "device-originated symbolic definition" as to show that the symbolic definitions may change during operation and/or actual implementation. In this way, the present embodiments described herein may better enable the user to describe different datasets, associate a dataset to one or more other datasets by defining a relationship between the respective datasets, define transaction conditions to detail a custom workflow for data communication through an industrial automation system 10 using the data model described herein, and the like.

Technical effects of the systems and methods described herein include using symbolic data methods to modify existing symbolic definitions associated with an industrial automation device. Indeed, an industrial automation device may correspond to an original set of templates and symbols. During operation, a computing device may receive an input corresponding to a modification or addition to make to the original set of templates and symbols. In response to the input, the computing device may generate an additional set of templates and/or symbols to append or associate with the original set of templates and symbols, where the two together may be referred to as an enhanced set of templates and symbols (e.g., enhanced symbolic definition). By enabling enhanced symbolic definitions to be applied and used at run-time, such as after an initial commissioning of the industrial automation device, changes over time to an industrial automation system, to components of the industrial automation device, to how the industrial automation device is used, or the like, may be accurately captured in the symbolic definition used to control and interface with the industrial automation device. Operations described herein also include under what situations information from enhanced template data may be transmitted or excluded from transmission to a requesting device. Indeed, there may be advantages to not automatically transmitting on the additional template data appended to original template data, such as when a requesting device cannot process it. By doing so, certain operational benefits may be realized such as more efficient resource consumption and power consumption by not spending resources processing or transmitting template data unable to be received. By using systems and methods to reference operational data based on symbolic data operations, fewer look-up operations may be used to route data from a data source to a data consuming device, and thus fewer computing operations may be used to implement control and processing operations relative to other systems not using symbolic data operations.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method comprising:
    receiving, via a processor, a first symbol object instance of a plurality of symbol object instances from an industrial automation device, wherein a first template object instance is configured to characterize a dataset stored in a memory component accessible to the industrial automation device via the plurality of symbol object instances, wherein each of the plurality of symbol object instances are categorized via the first template object instance with respect to one or more of a plurality of categories comprising an identity of the industrial automation device, a state of the industrial automation device, a runtime status of the industrial automation device, maintenance status associated with the industrial automation device, sustainability information of the industrial automation device, or any combination thereof, and wherein the plurality of symbol object instances and the first template object instance correspond to an original symbolic definition associated with the industrial automation device;
    receiving, via the processor, a first input that comprises an indication of one or more additional categories relative to the original symbolic definition;
    identifying, via the processor, a type of the industrial automation device based on the first template object instance associating the first symbol object instance to the identity of the industrial automation device;
    generating, via the processor, enhanced template data at least in part by appending the one or more additional categories to the first template object instance, wherein the enhanced template data comprises one or more instantaneous values associated with the dataset and a template object instance comprising indications of one or more of the plurality of categories associated with the plurality of symbol object instances;
    sending, via the processor, the enhanced template data to one or more devices configured to associate the dataset with the enhanced template data; and
    controlling, via the processor, an operation of the industrial automation device based on the enhanced template data.

2. The method of claim 1, wherein the first input comprises an indication of a second symbol object instance configured to reference an additional dataset stored in the memory component accessible to the industrial automation device, wherein the additional dataset is characterized relative to the one or more additional categories, and wherein generating, via the processor, the enhanced template data comprises appending the second symbol object instance to the plurality of symbol object instances in association with the one or more additional categories.

3. The method of claim 1, comprising:
    prior to receiving the first input:
        generating, via the processor, template data based on the type of the industrial automation device and the first symbol object instance; and
        sending, via the processor, a control signal to the industrial automation device based on the template data.

4. The method of claim 1, comprising:
    generating, via the processor, a graphical user interface comprising one or more properties of the first symbol object instance; and receiving, via the processor, the first input via the graphical user interface, wherein the first input corresponds to a selection of at least a portion of the one or more properties of the first symbol object instance.

5. The method of claim 1, comprising:
sending, via the processor, a control signal to the industrial automation device based on the enhanced template data; and
receiving, via the processor, updated template data exposed by the industrial automation device based on the control signal and the enhanced template data, wherein the industrial automation device is configured to generate the updated template data at least in part by applying a configuration corresponding to the enhanced template data.

6. The method of claim 5, comprising:
receiving, via the processor, a request for the updated template data from a requesting device configured to operate using a first protocol;
sending, via the processor, a query for the updated template data to the industrial automation device in a second protocol;
receiving, via the processor, the updated template data formatted in the second protocol;
converting, via the processor, the updated template data from the second protocol to the first protocol, thereby generating converted template data; and
sending, via the processor, the converted template data to the requesting device.

7. The method of claim 1, wherein the enhanced template data comprises one or more datasets associated with one or more child devices communicatively coupled to the industrial automation device.

8. A tangible, non-transitory, computer-readable medium comprising instructions that, when executed by a processor, cause a control system to perform operations comprising:
receiving a first symbol object instance of a plurality of symbol object instances from an industrial automation device, wherein a first template object instance is configured to characterize a dataset stored in a memory component accessible to the industrial automation device via the plurality of symbol object instances, wherein each of the plurality of symbol object instances are categorized via the first template object instance with respect to one or a plurality of categories comprising an identity of the industrial automation device, a state of the industrial automation device, a runtime status of the industrial automation device, maintenance status associated with the industrial automation device, sustainability information of the industrial automation device, or any combination thereof, and wherein the plurality of symbol object instances and the first template object instance correspond to an original symbolic definition associated with the industrial automation device;
receiving a first input that comprises an indication of one or more additional categories relative to the original symbolic definition;
identifying a type of the industrial automation device and respective types of one or more child devices associated with the industrial automation device based on the first template object instance associating the first symbol object instance to the identity of the industrial automation device;
generating enhanced template data at least in part by appending the one or more additional categories to the first template object instance based on the respective types of the one or more child devices, wherein the enhanced template data comprises one or more instantaneous values associated with the dataset, a template object instance comprising indications of one or more of the plurality of categories associated with the plurality of symbol object instances, and one or more datasets associated with the one or more child devices;
sending the enhanced template data to one or more devices configured to associate the dataset with the enhanced template data; and
controlling an operation of the industrial automation device based on the enhanced template data.

9. The tangible, non-transitory, computer-readable medium of claim 8, wherein the one or more additional categories correspond to an addition of the one or more child devices to the industrial automation device.

10. The tangible, non-transitory, computer-readable medium of claim 8, the operations comprising:
receiving an additional template data from the industrial automation device bypassing an industrial automation control system, wherein the memory component is configured to expose the additional template data to the industrial automation device, the processor, and the industrial automation control system;
storing the additional template data in an additional memory component accessible to the processor to replace the enhanced template data in the additional memory component;
determining an adjustment to the operation of the industrial automation device based on a change in data corresponding to the one or more child devices between the additional template data and the enhanced template data; and
sending a control signal to the industrial automation device based on the adjustment.

11. The tangible, non-transitory, computer-readable medium of claim 10, wherein the additional template data comprises context data associated with a sensor that acquired the dataset, wherein a respective child devices of the one or more child devices corresponds to the sensor, and wherein the context data comprises a label describing the sensor, a timestamp associated with each of the one or more instantaneous values, a relative location of each of the one or more instantaneous values within the additional template data, or any combination thereof.

12. The tangible, non-transitory, computer-readable medium of claim 8, the operations comprising:
generating template data based on the type of the industrial automation device and the first symbol object instance; and
sending a control signal to the industrial automation device based on the template data.

13. The tangible, non-transitory, computer-readable medium of claim 8, the operations comprising:
sending a control signal to a respective child device of the one or more child devices based on the enhanced template data; and
receiving updated template data from the respective child device based on the control signal and the enhanced template data, wherein the industrial automation device is configured to generate the updated template data at least in part by applying a configuration corresponding to the enhanced template data.

14. The tangible, non-transitory, computer-readable medium of claim 13, the operations comprising:

receiving a request for the updated template data from a requesting device configured to operate using a first protocol;

sending a query for the updated template data to the industrial automation device in a second protocol;

receiving the updated template data formatted in the second protocol;

converting the updated template data from the second protocol to the first protocol, thereby generating converted template data; and sending the converted template data to the requesting device.

15. A tangible, non-transitory, computer-readable medium comprising instructions that, when executed by a processor, cause a control system to perform operations comprising:

receiving a first symbol object instance of a plurality of symbol object instances from an industrial automation device, a first template object instance is configured to characterize a dataset stored in a memory component accessible to the industrial automation device via the plurality of symbol object instances, wherein each of the plurality of symbol object instances are categorized via the first template object instance with respect to one or more of a plurality of categories comprising an identity of the industrial automation device, a state of the industrial automation device, a runtime status of the industrial automation device, maintenance status associated with the industrial automation device, sustainability information of the industrial automation device, or any combination thereof, and wherein the plurality of symbol object instances and the first template object instance correspond to an original symbolic definition associated with the industrial automation device;

receiving a first input that comprises an indication of one or more additional categories relative to the original symbolic definition;

identifying a type of the industrial automation device based on the first template object instance associating the first symbol object instance to the identity of the industrial automation device;

generating enhanced template data at least in part by appending the one or more additional categories to the first template object instance, wherein the enhanced template data comprises one or more instantaneous values associated with the dataset and a template object instance comprising indications of one or more of the plurality of categories associated with the plurality of symbol object instances; and controlling an operation of the industrial automation device based on the enhanced template data.

16. The tangible, non-transitory, computer-readable medium of claim 15, the operations comprising:

receiving a second input corresponding to the first symbol object instance;

identifying a type of a child device associated with the industrial automation device based on the second input;

generating additional template data based on the type of the industrial automation device, the first input, the first symbol object instance, and the type of the child device;

nesting the additional template data within the enhanced template data; and sending the enhanced template data with the additional template data to the industrial automation device configured to associate sensor data corresponding to the child device with the enhanced template data.

17. The tangible, non-transitory, computer-readable medium of claim 15, the operations comprising:

prior to receiving the first input:

generating template data based on the type of the industrial automation device and the first symbol object instance; and sending a control signal to the industrial automation device based on the template data.

18. The tangible, non-transitory, computer-readable medium of claim 15, the operations comprising:

generating a graphical user interface comprising one or more properties of the first symbol object instance; and receiving the first input via the graphical user interface, wherein the first input corresponds to a selection of at least a portion of the one or more properties of the first symbol object instance.

19. The tangible, non-transitory, computer-readable medium of claim 15, the operations comprising:

sending a control signal to the industrial automation device based on the enhanced template data; and receiving updated template data from the industrial automation device based on the control signal and the enhanced template data, wherein the industrial automation device is configured to generate the updated template data at least in part by applying a configuration corresponding to the enhanced template data.

20. The tangible, non-transitory, computer-readable medium of claim 19, the operations comprising:

receiving a request for the updated template data from a requesting device configured to operate using a first protocol;

sending a query for the updated template data to the industrial automation device in a second protocol;

receiving the updated template data formatted in the second protocol;

converting the updated template data from the second protocol to the first protocol, thereby generating converted template data; and sending the converted template data to the requesting device.

* * * * *